US010593129B2

(12) United States Patent
Bruce et al.

(10) Patent No.: US 10,593,129 B2
(45) Date of Patent: Mar. 17, 2020

(54) COGNITIVE AND DYNAMIC VEHICULAR PARKING

(71) Applicant: International Business Machines Corporation, Armonk, NY (US)

(72) Inventors: Edwin J. Bruce, Corinth, TX (US); Romelia H. Flores, Keller, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 15/463,852

(22) Filed: Mar. 20, 2017

(65) Prior Publication Data
US 2018/0268617 A1 Sep. 20, 2018

(51) Int. Cl.
| G07B 15/02 | (2011.01) |
| G06Q 10/02 | (2012.01) |
| G08G 1/14 | (2006.01) |
| G08G 1/04 | (2006.01) |
| G08G 1/015 | (2006.01) |

(52) U.S. Cl.
CPC ............ *G07B 15/02* (2013.01); *G06Q 10/02* (2013.01); *G08G 1/015* (2013.01); *G08G 1/04* (2013.01); *G08G 1/142* (2013.01); *G08G 1/143* (2013.01); *G08G 1/144* (2013.01); *G08G 1/146* (2013.01); *G08G 1/147* (2013.01)

(58) Field of Classification Search
CPC . G06Q 30/0283–0284; G06Q 2240/00; G07B 15/02
See application file for complete search history.

(56) References Cited

U.S. PATENT DOCUMENTS

| 2007/0008181 | A1 | 1/2007 | Rollert et al. | |
| 2012/0112929 | A1* | 5/2012 | Gupta | G08G 1/146 340/932.2 |
| 2012/0245966 | A1 | 9/2012 | Volz | |
| 2014/0149153 | A1 | 5/2014 | Cassandras et al. | |
| 2015/0138001 | A1 | 5/2015 | Davies et al. | |
| 2015/0149263 | A1* | 5/2015 | Stenneth | G07B 15/02 705/13 |

(Continued)

OTHER PUBLICATIONS

Geng, et al., New "Smart Parking" System Based on Resource Allocation and Reservations, IEEE Transactions on Intelligent Transportation Systems, vol. 14, No. 3, Sep. 2013, pp. 1129-1139.*

(Continued)

*Primary Examiner* — Daniel Vetter
(74) *Attorney, Agent, or Firm* — Aaron Pontikos, Esq.; George S. Blasiak, Esq.; Heslin Rothenberg Farley & Mesiti, PC

(57) ABSTRACT

Methods, computer program products, and systems are presented. The method computer program products, and systems can include, for instance: obtaining user information of a vehicle driver user, the vehicle driver user being a user of a computer based system for managing a parking area; processing information of the user information; and outputting a communication to control an indicator system based on the processing, wherein the indicator system is provided as a fixture of the parking area and wherein the indicator system is configured to provide indications viewable by vehicle drivers driving within the parking area.

19 Claims, 13 Drawing Sheets

(56) References Cited

U.S. PATENT DOCUMENTS

| | | | | |
|---|---|---|---|---|
| 2015/0371156 A1* | 12/2015 | Jacob | ............... | G06Q 10/02 |
| | | | | 705/5 |
| 2016/0027302 A1 | 1/2016 | Gupta et al. | | |
| 2016/0063862 A1* | 3/2016 | Rosen | ............... | G08G 1/015 |
| | | | | 340/932.2 |
| 2016/0133134 A1* | 5/2016 | Todasco | ............. | G07B 15/02 |
| | | | | 705/13 |
| 2016/0180261 A1* | 6/2016 | Rosen | ............... | G06Q 10/02 |
| | | | | 705/5 |
| 2016/0307047 A1* | 10/2016 | Krishnamoorthy | ....... | G06T 7/73 |
| 2017/0206786 A1* | 7/2017 | Dhondse | ............. | G08G 1/143 |
| 2017/0267233 A1* | 9/2017 | Minster | ............. | B62D 15/02 |
| 2017/0329342 A1* | 11/2017 | Kazama | ............. | G05D 1/0011 |
| 2017/0341640 A1* | 11/2017 | Liu | ............... | G08G 1/144 |
| 2018/0218605 A1* | 8/2018 | Mowatt | ............. | G08G 1/144 |

OTHER PUBLICATIONS

Anonymous, "A System and Method for Automating and Continuous Updates of Parking Reservations" ip.com, ip.com No. IPCOM000223086D, Published Nov. 1, 2012.

* cited by examiner

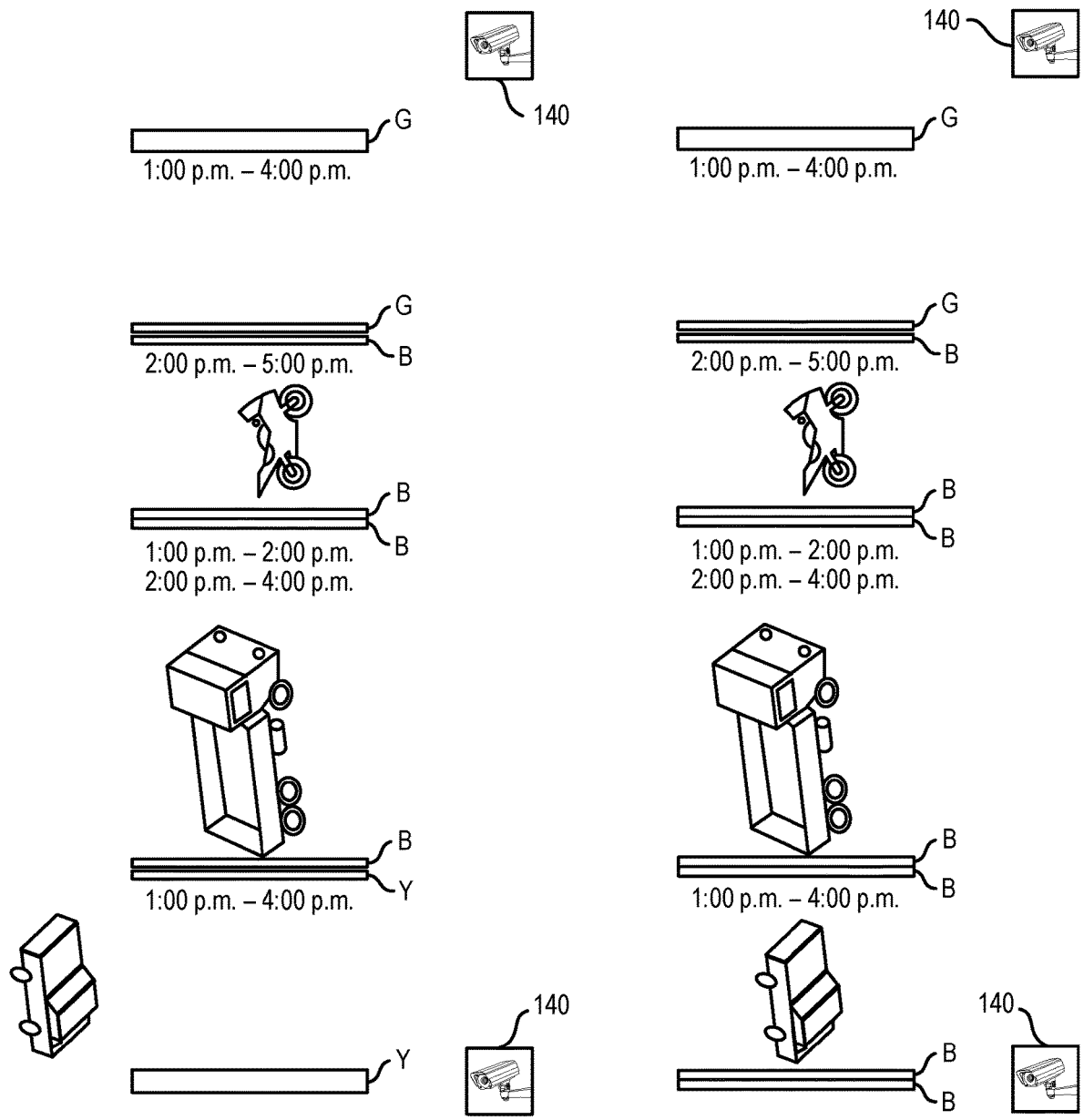

COGNITIVE AND DYNAMIC VEHICULAR PARKING

BACKGROUND

The present disclosure relates to artificial intelligence systems in general and in particular an intelligent parking area for vehicular parking.

Parking areas tend to fall into two categories. Roadside parking areas include parking spaces running parallel to an edge of a road and are normally characterized by parking spaces delimited by predetermined borders marked with permanent indicia on a road. Parking lot parking areas are available in a variety of configurations such as street level parking lots often having a uniform ground elevation and parking garages having varying ground elevations. Parking lot parking areas are also normally characterized by parking spaces delimited by predetermined borders marked with permanent indicia on a road.

Parking meters have been implemented in both roadside parking areas and parking lot parking areas. In a traditional configuration, parking meters have been deployed adjacent to a single parking space or to a pair of adjacent parking spaces. In a traditional configuration parking meters have accepted coin deposits and have indicated a time display displaying a remaining time left at a parking space. In more modern configuration centralized parking meters have been deployed in the form of parking kiosks. Coins, paper money and cards can be deposited into such kiosks. On completion of transaction a paper receipt can be printed at a kiosk for display on a dashboard of a vehicle driver user.

SUMMARY

Shortcomings of the prior art are overcome, and additional advantages are provided, through the provision, in one aspect, of a method. The method can include, for example: obtaining user information of a vehicle driver user, the vehicle driver user being a user of a computer based system for managing a parking area; processing information of the user information; and outputting a communication to control an indicator system based on the processing, wherein the indicator system is provided as a fixture of the parking area and wherein the indicator system is configured to provide indications viewable by vehicle drivers driving within the parking area.

In another aspect, a computer program product can be provided. The computer program product can include a computer readable storage medium readable by one or more processing unit and storing instructions for execution by one or more processor for performing a method. The method can include, for example: obtaining user information of a vehicle driver user, the vehicle driver user being a user of a computer based system for managing a parking area; processing information of the user information; and outputting a communication to control an indicator system based on the processing, wherein the indicator system is provided as a fixture of the parking area and wherein the indicator system is configured to provide indications viewable by vehicle drivers driving within the parking area.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining user information of a vehicle driver user, the vehicle driver user being a user of a computer based system for managing a parking area; processing information of the user information; and outputting a communication to control an indicator system based on the processing, wherein the indicator system is provided as a fixture of the parking area and wherein the indicator system is configured to provide indications viewable by vehicle drivers driving within the parking area.

Additional advantages are provided, through the provision, in one aspect, of a method. The method can include, for example: obtaining user information of a vehicle driver user, the vehicle driver user being a user of a computer based system for managing a parking area; processing information of the user information; and outputting one or more communication based on the processing.

Additional advantages are provided, through the provision, in one aspect, of a method. The method can include, for example: obtaining data source information of one or more data source; processing information of the data source information; and outputting one or more communication based on the processing.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 8 depicts a parking area in use in one embodiment;
FIG. 9 depicts a parking area in use in one embodiment.

DETAILED DESCRIPTION

Figure 1:
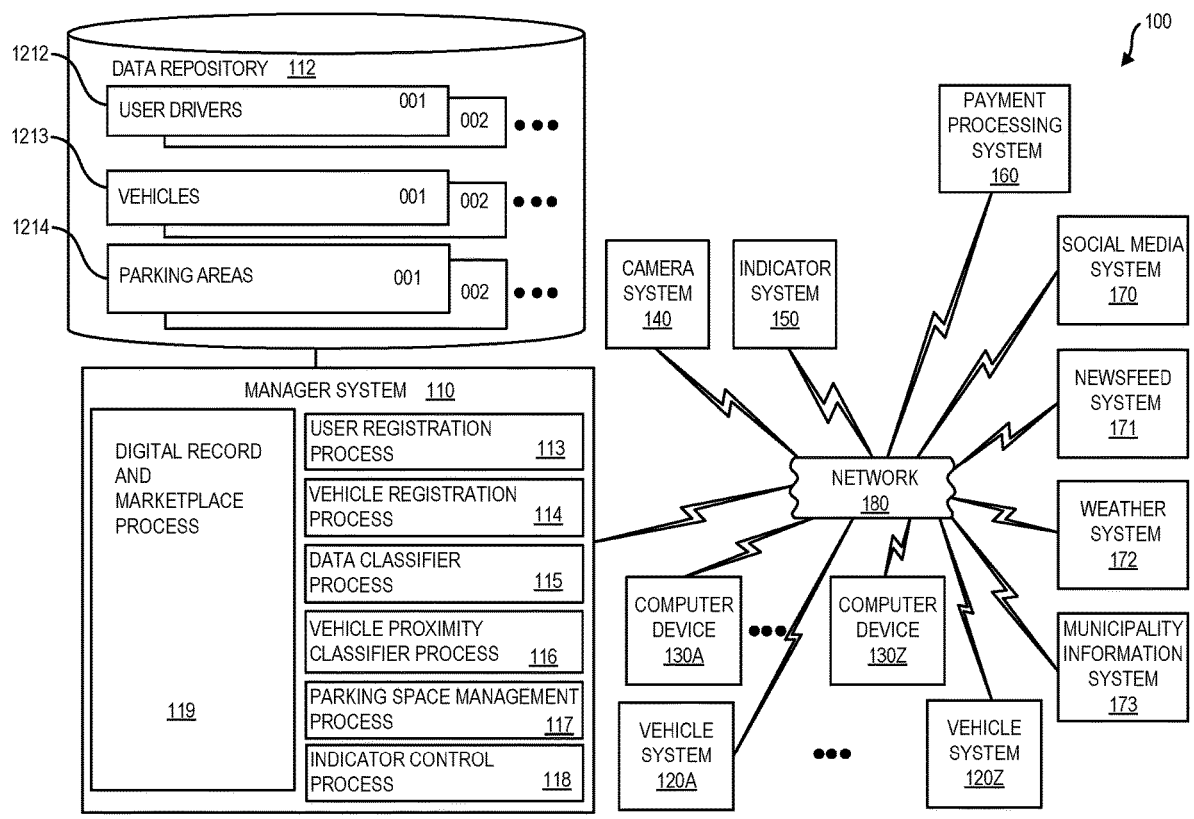
FIG. 1 depicts the system having a manager system, a camera system, and an indicator system in one embodiment.

FIG. 1 is a block diagram of a system 100, in accordance with an embodiment as set forth herein. In the embodiment of FIG. 1, system 100 includes numerous devices, which may include computing node based devices connected by a network 180. For example, network 180 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 1 depicts an example environment. In one embodiment, system 100 can include a manager system 110, a plurality of vehicle systems 120A-120Z, and a plurality of computer devices 130A-130Z. System 100 can include camera system 140, indicator system 150, payment processing system 160, social media system 170, newsfeed system 171, weather service system 172, and municipality information system 173. In one embodiment manager system 110 can be external to each system 120A-120Z, 140, 150, 160, 170-173, and to each of the one or more user computer device 130A-130Z. In one embodiment manager system 110 can be co-located with one or more system of systems 120A-120Z, 140, 150, 160, 170-173. In one embodiment, manager system 110 can be co-located with one or more user computer device 130A-130Z.

Manager system 110 in one embodiment can run a variety of processes including a user registration process 113, a vehicle registration process 114, a data classifier process 115, a vehicle proximity classifier process 116, a parking space management process 117, and a digital record and marketplace process 119. Manager system 110 can include an associated data repository 112. Data repository 112 can store in user drivers area 1212 information on a plurality of vehicle driver users e.g. vehicle driver user 001 and vehicle driver user 002 and additional drivers. Area 1212 can store for each vehicle driver user an activity record that specifies states for a user that digitally indicate user rights in one or more parking space. Data repository 112 can store various vehicle driver information such as the information stored in area 1212 and user vehicle information associated to vehicle driver users. User vehicle information on several vehicles can be stored in vehicles area 1213. Data repository 112 can also include parking areas area 1214 storing e.g. geographic coordinate area information on a plurality of different parking areas. However, it will be understood that in some embodiments manager system 110 may be implemented to manage a single parking area. For each parking area, there can be stored in area 1214 a history of parking spaces. Parking space information can include for each parking space coordinates of the parking space, user(s), and time period, prices and the like. Such parking space information can be associated to information of user drivers area 1212. For example, an activity record for a user stored in area 1212 can store records for each parking space (including e.g. coordinates of the parking space, user(s), and time period, prices and the like) that has been historically allocated to each user.

Data classifier process 115 can classify incoming data e.g. from social media system 170, newsfeed system 171, weather service system 172, and municipality information system 173. Data classifier process 115 can also classify incoming image data from camera system 140. In one embodiment, data classifier process can run a natural language processing (NLP) process for classifying e.g. incoming text data and/or audio data into topic classifications.

Manager system 110 can use the classification information e.g. to make decisions on the time of arrival of various vehicles to a parking area, such as vehicles associated with vehicle system 120A and vehicle system 120Z. Data classifier process 115 can also run a spatial image data classifier process e.g. to classify image information received from camera system 140. Camera system 140 can be e.g. an M×N pixel image sensor based camera system having one or more camera and/or a laser-based camera imaging system having one or more camera. Based on image data classification performed by data classifier process 115, manager system 110 can e.g. determine a presence of a vehicle in a parking area and a precise location of a vehicle in a parking area, e.g. can determine that a vehicle is in a particular parking space of a plurality of candidate parking spaces.

Vehicle proximity classifier process 116 can classify a vehicle as being in proximity with a parking area or not in proximity with a parking area. Vehicle proximity classifier process 116 can use a plurality of different types of inputs e.g. received input data output from camera system 140 providing spatial image data and/or location e.g. GPS output data as can be output from a computer device e.g. computer device 130A and/or a vehicle system e.g. vehicle system 120A associated with the vehicle. Manager system 110 can establish a geofence defining a parking area and can determine that a vehicle is in a parking area when a vehicle is determined to be within a geofence established to define a parking area.

Parking space management process 117 can manage and maintain e.g. area 1214 of data repository 112 as well as in users area 1212 of data repository 112 a record of dimensional information and positions of parking spaces within a parking area. For example, based on user-defined selection data defined using a manually operated user interface and/or vehicle dimension data and/or driving ability information of a vehicle driver user, parking space management process 117 can automatically determine required coordinate area dimensions of a parking space and can dynamically select the location for a parking space within a parking area.

Indicator control process 118 can control indications provided by indicator system 150 which can provide indications viewable by persons in a parking area. For example, indicator control process 118 can change an indication provided by indicator system 150 when a user vehicle driver reserves a parking space and/or arrives at a parking area and/or a vehicle of the user driver is parked and/or a change in a current reservation or purchase agreement is made and/or the user initiates exiting of a parking space. Indicator system 150 can include components provided as fixtures of a parking area.

Digital records and marketplace process 119 can maintain e.g. in users area 1212 and in area 1214 of data repository 112 an activity record specifying rights of a user vehicle drivers in respect to one or parking space of the respective vehicle driver users. Digital records and marketplace process 119 can change a state of an activity record of user specifying rights of a user in respect to one or more parking space e.g. in terms of parking space reservations of the user, updates to a parking space reservation agreement, reservation change processes e.g. as may occur when a vehicle driver user parks at a new parking space rather than a reserved parking space on arrival at a parking area, or when a user driving a vehicle initiates exiting prior to an expiration of a reservation. Digital records and marketplace process 119 can be in communication with payment processing system 160 to facilitate financial transactions between various entities users and the one or more entity of running manager system 110. Payment processing system 160 can include in one embodiment a blockchain ledger network system and/or a financial institution system.

Regarding one or more user vehicle system 120A-120Z a vehicle system of one or more user vehicle system 120A-120 can include a vehicle on-board computing node based system in network communication with external computing node based system. Regarding one or more user computer device 130A-130Z, a computer device of one or more user computer device 130A-130Z in one embodiment can be provided by a computing node based client computer, e.g. a mobile device, e.g. a smartphone or tablet, a laptop or PC that runs one or more program including a web browser for browsing web pages. Camera system 140 can include one or more component installed as a fixture of a parking area and therefore can be regarded as being provided as a fixture of a parking area. Camera system 140 can include one or more camera oriented to obtain spatial image data representing a parking area. Social media system 170 can include a collection of files, including for example, HTML files, CSS files, image files, and JavaScript files. Social media system 170 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC).

Figure 2:
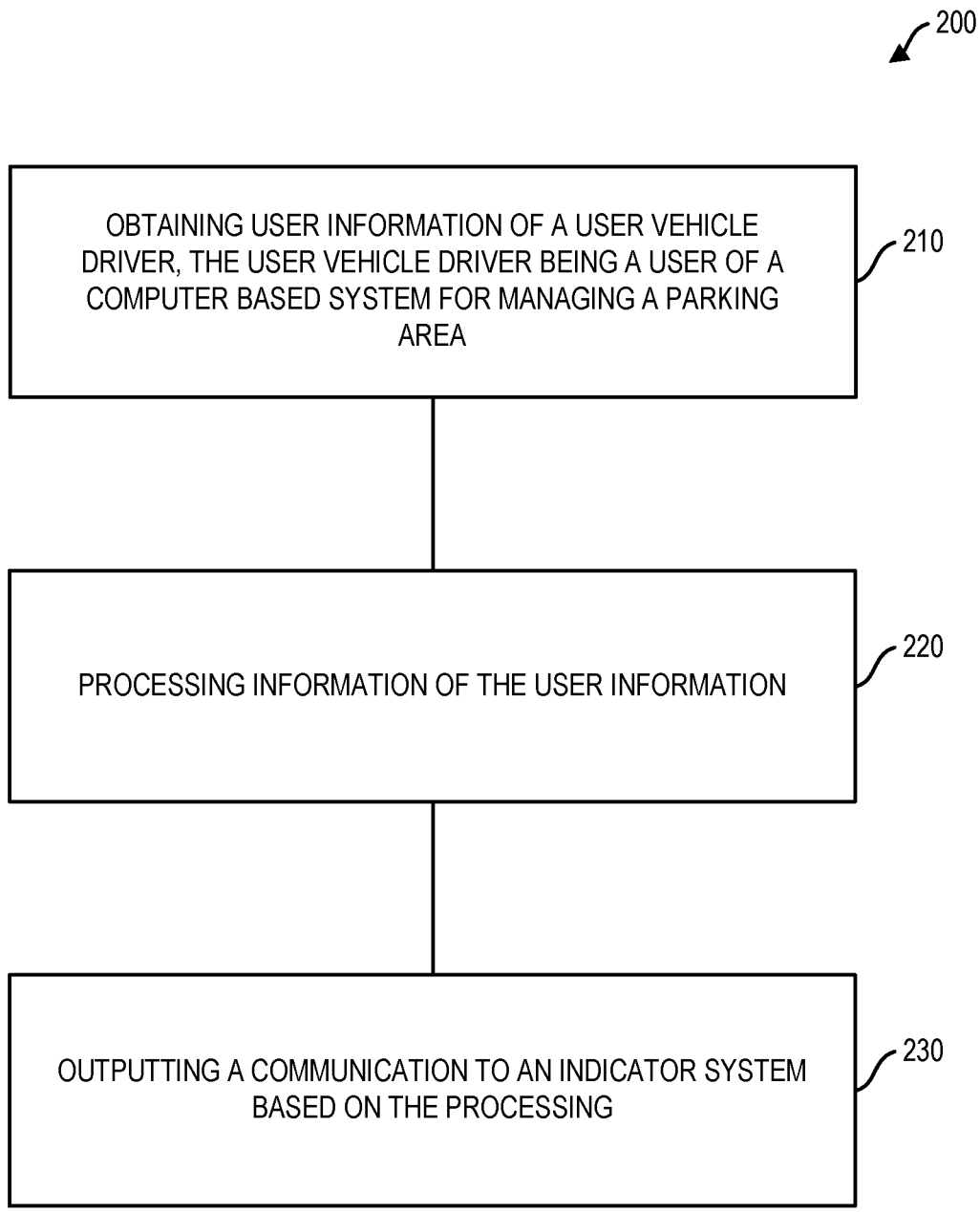
FIG. 2 depicts a flowchart illustrating a method for use in managing a parking area in one embodiment.

FIG. 2 is a flowchart illustrating a method 200 in accordance with one or more aspects set forth herein. In one embodiment method 200 at block 210 can include obtaining user information of a vehicle driver user, the vehicle driver user being a user of a computer based system for managing a parking area. In one embodiment method 200 at block 220 can include processing information of the user information. In one embodiment method 200 at block 230 can include outputting a communication to control an indicator system based on the processing. In one embodiment method 200 at block 230 can include outputting a communication to control an indicator system based on the processing, wherein the indicator system is provided as a fixture of the parking area and wherein the indicator system is configured to provide indications viewable by vehicle drivers driving within the parking area. In one embodiment method 200 at block 230 can include outputting one or more communication. In one embodiment method 200 at block 210 can include obtaining data source information of one or more data source. In one embodiment method 200 at block 220 can include processing information of the data source information.

In one embodiment, processing at block 220 can include processing to determine that a criteria is satisfied. Criteria determined to be satisfied can include e.g. that a vehicle driver user has arrived at location of a parking area, that a vehicle driver user has parked at a location of a parking space, that a vehicle driver user has initiated exiting of a parking space, that a vehicle driver user has exited a parking space, that a certain user interface selection has been made, that that parking space adjustment process has been performed based on a parking space adjustment condition being satisfied. Initiation of a parking space adjustment process can be based on a parking space adjustment condition being satisfied e.g., based on user defined selection information entered into manually operated user interface to select parking space adjustment, based on requisite dimensional information of a vehicle of a vehicle driver user being obtained, based on requisite driving ability information of a vehicle driver user being obtained, based on a parking accuracy determination result indicating inaccurate parking, based on requisite weather information being obtained. Outputting one or more communication at block 230 can include e.g. a communication to update an activity record, a communication to control an indicator system, a communication to control a user interface, a communication to log an entry into a payment processing system 160.

In one embodiment manager system 110 can be iteratively monitoring user data and other data of data source and based on a criteria being satisfied can perform outputting a communication to update an activity record for one or more user, can perform outputting a communication to control an indicator system, can perform outputting a communication to control a user interface, and can perform outputting a communication to log an entry into a payment processing system. In one example of such an embodiment, manager system 110 can be iteratively monitoring user data and other data of data source and based on a criteria being satisfied can perform outputting a communication to update an activity record for one or more user, and based on an examining of the activity record can perform outputting of one or more communication, e.g. to control an indicator system, to control a user interface, to log an entry into a payment processing system.

Figure 3:
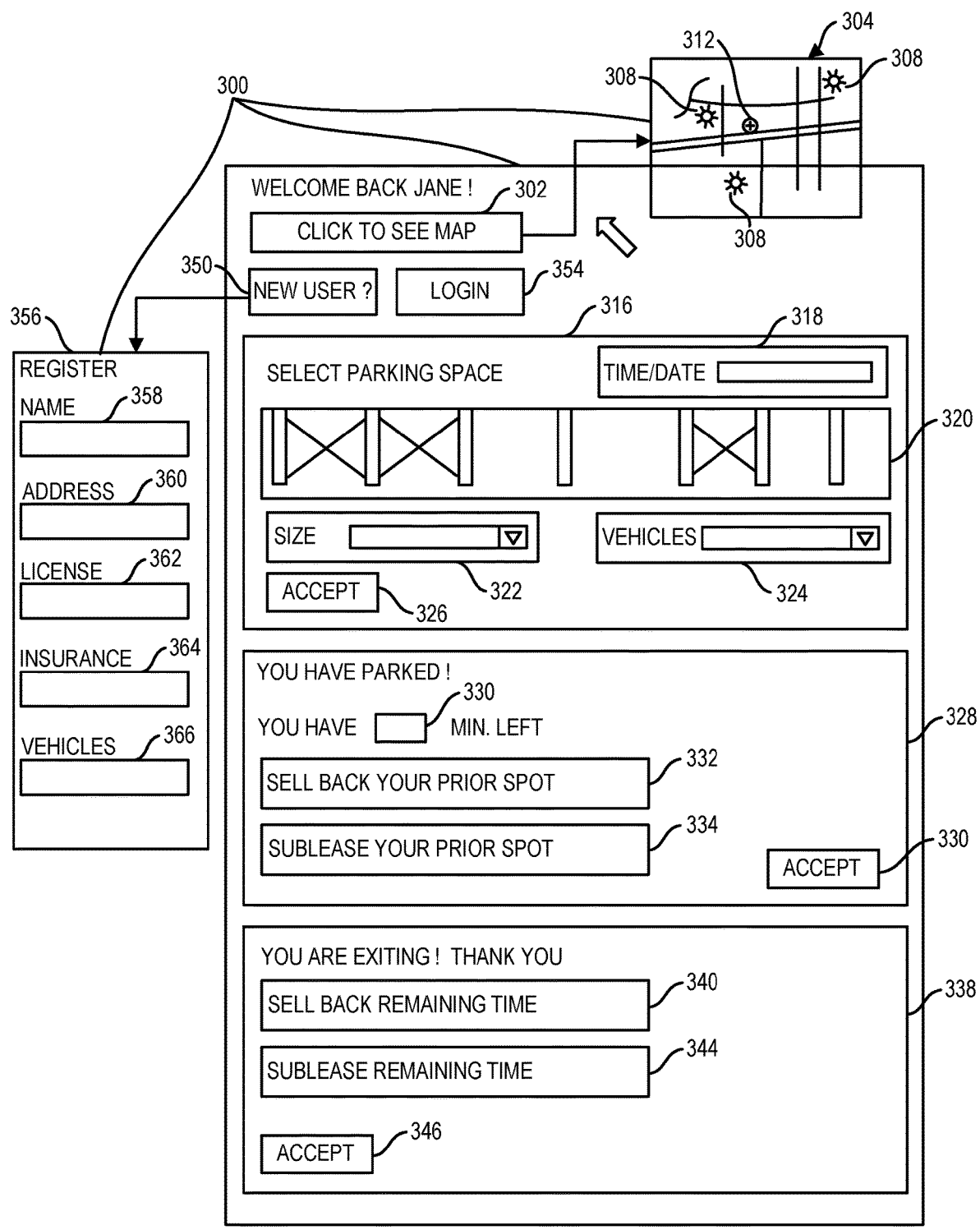
FIG. 3 depicts a user interface for use by a user vehicle driver of a system in one embodiment.

FIG. 3 illustrates an embodiment of a user interface 300 that can be displayed on a user computer device e.g. computer device 130 A for use by the user e.g. for making parking space reservations, changing parking space reservations, and registering users and/or vehicles into system 100 registered users of system 100 managed by manager system 110. User interface 300 can be displayed e.g. on a display of a computer device e.g. computer device 130A and/or a display of a vehicle system e.g. vehicle system 120A. In one embodiment, user interface 300 includes a web page served by manager system 110.

Referring to user interface 300, a user can select button 302 to call up a map 304 to permit selection of a parking area in which a user would like to park his or her vehicle. Referring to map 304, map 304 can designate candidate parking areas 308 and a current location 312 if the map encompasses the location of the current location of the user.

Using area 316 a user can select a parking space, in area 318 a user can designate a time and date for parking space reservation. In area 320 a user can be presented with representation of the parking area selected. In area 320 parking spaces that are already reserved for the designated time are indicated as being unavailable, and areas available for reservation are indicated to be available. Using area 320, a vehicle driver user can indicate a preferred parking space. At area 322 a user can select dimension information of parking space. In some instances e.g. for a larger fee, manager system 110 can guarantee delivery of the certain preferred parking space selected. In some instances, manager system 110 can guarantee delivery of a parking space having dimension information selected, but (for purposes of facilitating dynamic re-allocation of parking spaces) may not guarantee delivery of a parking space at the precise coordinates selected using area 320. In such instances manager system 110 can initiate display on user interface an information message e.g. "WE WILL ATTEMPT TO MATCH THE COORDINATES SELECTED".

System 100 can provide for dynamic expansion and retraction of a parking space dimension e.g. based on user-defined configuration data and/or other data such as looked-up dimension information on a vehicle and/or driving ability information. In area 324 a user can select a vehicle associated with the user which will be parked in the selected parking area. Manager system 110, in area 1214 in data repository 112 of manager system 110 can have previously stored information on vehicles registered to a certain user by the certain user entering registration data using a manually operated user interface of a computer device of the certain user. In some embodiments manager system 110 can dynamically and automatically detect for registration into manager system 110 vehicles in which a user in currently located e.g. by performing processing including examining camera image data and/or motion data received and processed from a user computer device e.g. computer device 130A.

Using button 326 a user can accept a currently defined reservation. At area 328 user interface 300 can display information to a user if the user's vehicle is in a state of being parked. Area 338 of user interface 300 can display information to a user, useful to the user when the vehicle user has initiated exiting a current parking area. Initiating exiting of a parking area can be automatically determined by manager system 110 e.g. using one or more of camera, image, motion, or location data of a computer device of the user e.g. computer device 130A. If a user is not currently logged in to manager system 110, a user can select button 354 to initiate the login process. If the user is a new user and has not previously registered, the user can select button 350 to initiate the registration process in which registration window 356 will be displayed.

Registration window 356 can display various registration information field such as name field 358 for entry of name information, address field 360 for entry of address information, license field 362 for entry of license plate and driver license information. Registration window 356 can display insurance field 364 to permit entry of insurance information and vehicle registration field 366 for designation of vehicles to be registered into manager system 110 for a certain user. Registration information entered using area 356 can be stored in areas 1212 and 1213 of data repository 112. In one aspect with driver license information registered into manager system 110, manager system can look up e.g. from municipality information system 173 a driving record of a registered user. Based on driving ability of a certain user indicated by a driving record, manager system 110 can activate parking space management process 117 to determine dimension information of a parking space for the certain user. Manager system 110 can allocate smaller dimensioned parking spaces to vehicle driver users of greater skill and can allocate larger dimensioned parking spaces to vehicle driver users of lesser skill who are more likely to benefit from additional space for purposes avoiding collisions with other vehicle marked in parking area.

Figure 4:
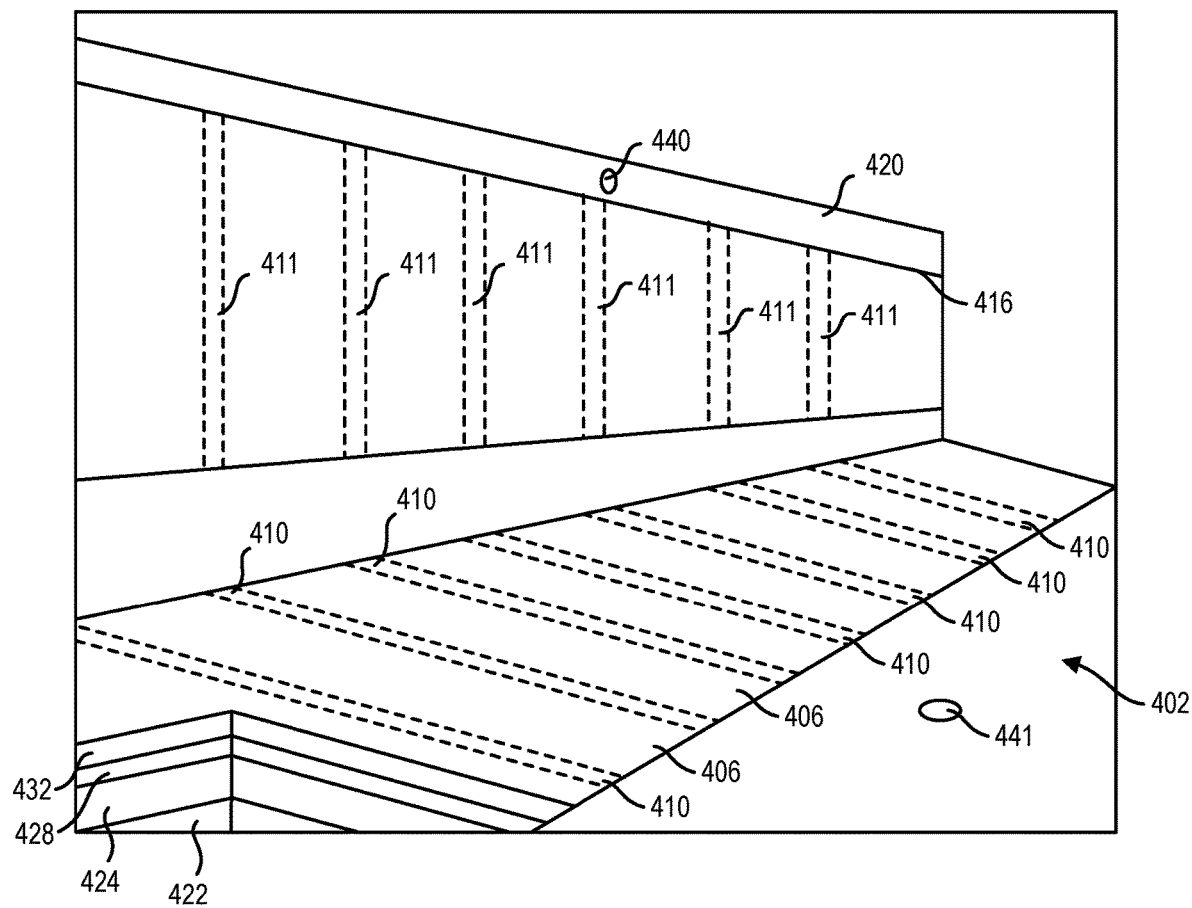
FIG. 4 depicts a perspective view of a parking area in one embodiment.

FIG. 4 illustrates a perspective view of a parking area 402 in one embodiment. Parking area 402 can include various parking spaces 406. Each parking space 406 can have locations and coordinate area dimension that are dynamically determined by manager system 110. Parking spaces 406 can be delimited by borders 410 that can be dynamically, temporarily, and non-permanently provided at varying locations over time. In addition or alternatively, locations of parking spaces 406 can be designated by electronic display 416 shown as being mounted on a vertically extending wall 420.

Electronic display 416 can display vertically extending borders 411 that are intersected by respective vertically extending planes extending through ground located borders 410. In one embodiment, system 100 includes borders 410 but is absent of borders 411. In one embodiment, system 100 can include borders 411 but can be absent of borders 410.

Various technologies can be used for the generation of borders 410 and 411. In one embodiment, ground-based lighting technology can be employed for the generation of dynamically and temporarily generated borders 410. For example, referring to FIG. 4 there can be provided a lighting layer 428 disposed on a pavement layer 424, which pavement layer 424 can be disposed on a base layer 422. Lighting layer 428 can include banks of different colored light emitting diodes (LEDs) distributed throughout the ground area of a parking area 406 together with appropriate load bearing structures configured to support the load of a vehicle. The LED banks can include e.g. green LEDs, blue LEDs, red LEDs, yellow LEDs, or variable color emission LEDs, which can be selectively energized to temporarily define green, blue, red, or yellow borders in different areas of a parking area 402. Lighting layer 428 can alternatively be provided by an electronic display. Above lighting layer 428 there can be disposed a light transmissive environmental layer 432 which environmentally protects the lighting layer 428 and permits light from the lighting layer 428 to be directed there through.

Components 428, 416, for providing of parking space borders 410, 411 illustrate components of indicator system 150 in one embodiment. Indicator system 150 can provide indications other than indications of locations of parking spaces e.g. electronic display 416 can indicate times associated with reservations of parking spaces. Manager system 110 can be operative to output a communication to indicator system 150 so that indicator system 150 provides a targeted indication. Alternative technologies can be included in indicator system 150 for generation of borders 410 and/or borders 411. For example, indicator system 150 can include a projector 440 for projecting light rays for the generation of borders 410 and/or projector 441 for projection of borders 411. In some embodiments system 100 is implemented with permanent indicia marking borders delimiting parking spaces rather than temporarily provided borders such as border 410 and/or 411. In such embodiments, system 100 can be implemented with one more feature described with reference to system 100 not involving functions involving a temporarily provided parking space border. Components which can be provided as component of an indicator system 150 such as lighting layer 428, electronic display 416, projector 440, and projector 441 can be provided as fixtures of parking area 402. By having one or more component provided as a fixture of a parking area 402, indicator system 150 can be regarded to be provided as a fixture of parking area 402.

Figure 5:
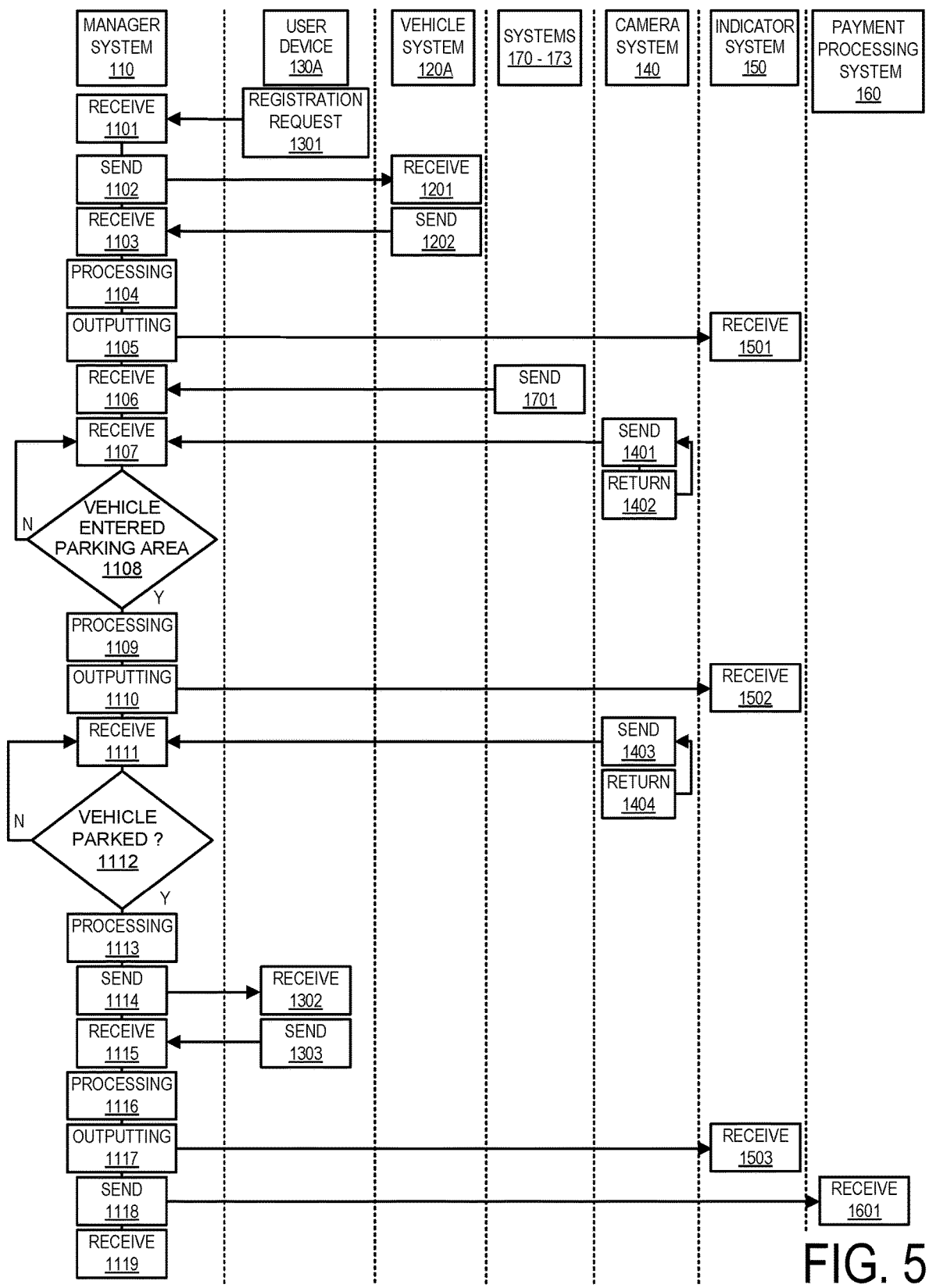
FIG. 5 is a flowchart depicting a method for use in managing a parking area in one embodiment.

A flowchart illustrating in one embodiment operation of system 100 is shown in FIG. 5, wherein exemplary functions are described with respect to manager system 110, user computer device 130A, vehicle system 120A, systems 170-173, camera system 140, indicator system 150, and payment processing system 160.

At block 1301 a user computer device 130A can send registration and/or reservation request information. For example, a user can use a manually operated user interface 300 as shown in FIG. 3 for registration of the user of manager system 110.

At block 1301 a user can use area 318 of user interface 300 to define and select a parking space in a parking area as set forth herein. At block 1101 manager system 110 can receive the registration and/or request information in response to receipt of registration information. Manager system 110 at block 1101 can activate user registration process 113 to register the user in the system. In some cases, manager system 110 can receive information on a vehicle associated user to be registered into manager system 110. In such situations, manager system 110 at block 1102 can send registration request information to vehicle system 120A associated with the current user for receipt by vehicle system 120A at block 1201. At block 1202 vehicle system 120A can send the requested vehicle registration information which can be received by manager system 110. At block 1103 manager system 110 can activate vehicle registration process 114 to register vehicle having vehicle system 120A into manager system 110A. With vehicle registration information obtained, manager system 110 can look up information on the registered vehicle for use in e.g. determining appropriate dimension information of parking spaces.

The embodiment of FIG. 5 describes communication with vehicle system 120A for determining information of vehicle system 120A. A vehicle can alternatively be auto-registered into manager system 110. For example, manager system 110 can auto-detect a vehicle in which a user is located using a sensor e.g. one or more of a camera sensor or motion sensor of a user computer device 130A of a user for purposes of detecting a vehicle, including vehicle type in which the user is currently located and can use that information for registration to put the vehicle into manager system 110. For determining dimension information of a registered vehicle manager system 110 can receive information from various systems external to manager system 110 e.g. systems 170-173, that include information regarding vehicle dimension information and associated with vehicle types.

At block 1104, manager system 110 can perform processing of information received at blocks 1101, 1103, and other information e.g. dimension information of a registered vehicle and the vehicle which the user has specified is the vehicle which is to be subject to parking at a selected parking area.

At block 1105 manager system 110 can perform outputting of a communication indicator system 150 to control and change an indication presented by indicator system 150. For example, based on a user's selection of a parking space manager system 110 can determine dimension information and location of the parking space at block 1104 and at block 1105 can output a communication to indicator system 150 so that borders e.g. borders 410 and/or borders 411 are generated to delineate the determined parking space. The dimension information of the determined parking space delimited by borders such as borders 410 and/or 411 indicated by indicator system 150 can be based on user input data and/or information such as, looked up dimension information of the vehicle being subject to parking, and/or looked up information provided by driving ability information as set forth herein. Manager system 110 can output a variety of communications based on user defined selected information entered using a manually operated user interface e.g. user interface 300, e.g. communications to update an activity record, to control indicator system 150, to control a user interface 300, to log an entry into a payment processing system 160. During performance of blocks 1102-1105 in one embodiment, user computer device 130A and the vehicle subject to parking e.g. the vehicle currently being occupied by the user can be remote from a parking area for which a driving space is reserved e.g. hundreds of feet, miles to tens of miles, or a farther distance.

During performance of block 1106 a vehicle driver user driving a vehicle can be in transit toward a parking area. At this time e.g. during performance of block 1106 systems 170-173 can be sending data source information to manager system 110 for receipt at block 1106. Based on such information received, which can include e.g. weather, traffic, construction pattern information and the like, manager system 110 can initiate a parking space adjustment process to dynamically adjust dimensions and/or locations of parking spaces previously determined for one or more user and can make adjustments to generated indicators indicated by indicator system 150. In one embodiment, manager system 110 can apply charges for a parking space in dependence on size of a space and other factors, most notably time. Accordingly, manager system 110 based on an adjustment to a dimension of parking space of a user can adjust a charge for a parking space and can output a communication to update an activity record for the user to specify the adjusted charge. Manager system 110 can output a variety of communications based on a parking space adjustment process being performed, e.g. communications to update an activity record, to control indicator system 150, to control a user interface 300, to log an entry into a payment processing system 160.

Manager system 110 can predict delays in arrivals and can initiate a parking space adjustment process to dynamically adjust parking spaces previously determined and can output a communication to indicator system 150 where appropriate for providing viewable indications of a parking space change. If snow is in the forecast as determined from data from weather service system 172 for example manager system 110 can initiate a parking space adjustment process to enlarge reserved parking spaces to provide additional space for parking. If criminal activity is ongoing about the location the parking area as determined from data from municipality information system 173 for example manager system 110 can e.g. initiate a parking space adjustment process to restrict the allocation of new parking spaces, auto-reserve parking spaces for police cars, and/or direct users to park at an alternate parking area away from the location of the current parking area. During performance of block 1106 manager system 110 can perform processing to examine user profile information stored in area 1212 of data repository 112 and for example can initiate a parking space adjustment process to allocate an enlarged parking space to users who have participated in a customer incentive program such as involving completion of a customer satisfaction survey. During performance of block 1106 manager system 110 can perform processing to look up information of a vehicle of vehicle system 120A being driven by a vehicle driver user and for purposes of promotion of an environmental conservation program can initiate a parking space adjustment process to allocate an enlarged parking space for a vehicle determined to satisfy an environmental conservation requirement (e.g. has a threshold passing energy efficiency or emissions rating). During performance of block 1106 manager system 110 can also be receiving data from one or more other vehicle system e.g. vehicle system 120Z and performing processing of such data. Manager system 110 can initiate a parking space adjustment process to dynamically adjust a dimension and/or location of parking spaces previously determined for one or more user and can make adjustments to generated indicators indicated by indicator system 150 based on the data from the one or more other vehicle system 120Z. For example, manager system 110 can examine location data e.g. GPS data of vehicle system 120Z of a vehicle and can determine e.g. that the vehicle of vehicle system 120Z will not arrive in time to park at a reserved parking space at a reserved time. Manager system 110 can responsively to such determining in one embodiment cancel the reservation and change the status of the parking space to not reserved and open and can output a communication, as shown e.g. at block 1110, to change an indicator provided by indicator system 150 to indicate the not reserved status of the parking space.

Manager system 110 can initiate a parking space adjustment process to adjust a parking space allocated to a certain user in a variety of situations as are set forth herein, including e.g. obtaining a selection from a user interface specifying e.g. a location and/or dimension of a parking space (which can override a default parking space allocation), determining information on a dimension of a vehicle being driven, determining information on driving ability of a vehicle driver user, weather information, customer incentive information, a detection of haphazardly parking within a reserved parking space to approach or exceed the allocated location coordinates for a parking area (described further in connection with block 1112). Manager system 110 for performing a process for adjusting a parking space for a certain user can apply based on initiation of a parking space adjustment process various rules based criteria. In one embodiment, rules base criteria applied by manager system 110 for adjusting an allocated parking space for a certain user 1.0 arbitrary unit A.U. laterally in a single row parking area having left and right permanent boundaries L and R can include the following rules as are outlined in Table A At block 1107 manager system 110 can receive data from camera system 140 and can at block 1107 perform processing of the camera system data received to determine whether a user driving the user vehicle has arrived at the location user parking area which can be defined by a geofence. Camera system 140 can be sending spatial image data representing the parking area at block 1401 repeatedly as indicated by return block 1402. Manager system 110 can repeat the loop of blocks 1107 and 1108 until user driving a user vehicle arrives at the parking area. By examining of spatial image data manager system 110 can determine a location of a vehicle and more specifically can determine whether a vehicle is within a geofence.

In addition or alternatively to performing processing of spatial image data at block 1107 manager system 110 can examine location data obtained by processing radio signals e.g. GPS data of user computer device 130A and or vehicle system 120A to determine whether vehicle driver user has arrived at a location of a parking area as may be defined by a geofence. On determining at block 1108 that a vehicle driver user has arrived at a location of parking area manager system 110 can proceed to block 1109 and can perform

TABLE A

Parking Space Adjustment Rules

1. If there are no nearest neighbor parking spaces that consume coordinate locations conflicting with such expansion enlarge the allocated parking space for the certain user by expanding the parking space 0.5 A.U. left and 0.5 A.U. right. The coordinate locations of the parking area delimited by the enlarged parking space will encompass an entirety of the original coordinate locations of the allocated parking space plus an area the right of original coordinate locations and an area to the left of the original coordinate locations.
2. If there is a nearest neighbor parking space consuming coordinate locations conflicting with expansion in a first direction, enlarge the allocated parking space by expanding the parking space 1.0 A.U. in a second direction opposite the first direction. The coordinate locations of the parking area delimited by the enlarged parking space will encompass an entirety of the original coordinate locations of the allocated parking space plus an area to the right or left of original coordinate locations of the allocated parking space.
3. If there are left and right nearest neighbor parking spaces that consume coordinate locations conflicting with expansion both in a left direction and right direction, shift the locations of the left and right nearest neighbor parking spaces left and right respectively to avoid conflict. Then enlarge the allocated parking space for the certain user by expanding the parking space 0.5 A.U. left and 0.5 A.U. right. The coordinate locations of the parking area delimited by the enlarged parking space will encompass an entirety of the original coordinate locations of the allocated parking space plus an area to the right or left of original coordinate locations of the allocated parking space. The shifted nearest neighbor parking spaces will delimit coordinate locations encompassing a subset of coordinate locations delimited by the nearest neighbor parking spaces prior to shift. If shifting a nearest neighbor parking space raises a conflict with a next neighbor parking space attempt to shift or relocate (so that an entirely new set of coordinate locations are delimited) the nearest neighbor parking space.
4. Cancel the enlarging based on a determining that conflicts presented by coordinate locations consumed by neighboring parking spaces are restricted by the permanent boundaries L and R such that the conflicts cannot be resolved by shifting or relocating neighboring parking spaces.

Coordinate locations set forth in Table A in one embodiment refer to a set of coordinates that define and delimit a certain two dimensional area occupied by a parking space. System 100 can be configured to permit adjustments of a dimension and size of a parking space allocation without wholesale relocation of a parking space to a new location having no points in common with a prior location. With system 100 a reallocated parking space of increased or decreased size can have coordinate locations in common with a parking space prior to reallocation. A reallocation can be adaptive and dynamic. For example a size adjustment for a parking space can be precisely adaptively selected to precisely match need and can be a size of any selected percentage relative to a size prior to reallocation.

further processing of received data e.g. including looking up reservation information corresponding to the vehicle arriving at the parking area.

At block 1110, manager system 110 can perform outputting of a communication to control and change an indication of indicator system 150 for receipt by indicator system 150 at block 1502. Outputting at block 1110 can be based on processing at blocks 1106-1109. For example a communication can include e.g. a communication to change the color of a one or more border 410 and/or border 411 indicating the user's reserved parking space. For example, prior to the user's arrival at the parking area indicator system 150 can indicate the user's parking space with red illumination and on arrival of a vehicle driver user at a parking area responsively to receipt of an output communication by manager system 110 can change the color of one or more border delimiting the user's parking space to a different color e.g. yellow so that the user is able to discriminate between parking spaces reserved by others e.g. indicated in red and the open parking space designated for the certain user e.g. which can based on the communication outputted at block 1110 can include yellow illumination. Manager system 110 can output a variety of communications based on arrival of a vehicle of a vehicle driver user at a parking area, e.g. communications to update an activity record, to control indicator system 150, to control a user interface 300, to log an entry into a payment processing system 160.

At block 1111 manager system 110 can receive and perform processing of spatial image data received from camera system 140 sent by camera system 140 at block 1403 to determine at block 1112 whether a certain user has parked the user's vehicle by determining whether the vehicle is at a location of certain user's parking space. At blocks 1111, manager system 110 can alternatively or additionally perform processing of received location data determined by radio signal processing e.g. GPS data of computer device 130A and/or vehicle system 120A to determine whether a certain user has parked the user's vehicle by determining whether the vehicle is at a location of certain user's parking space. Camera system 140 as indicated by return block 1404 can repeatedly send camera system spatial image data at block 1403.

At block 1112, manager system 110 can determine that a vehicle has been successfully parked and at block 1113 can perform further data processing e.g. to determine whether the vehicle driver user has parked the user's vehicle in the proper location or has selected another available parking space not previously reserved. Processing at block 1113 can include processing to determine whether the vehicle driver user has accurately parked the user's vehicle, e.g. by processing of spatial image data of camera system 140. Manager system 110 can initiate a parking space adjustment process to increase a size of a parking space as set forth herein based on recognizing that a vehicle driver user has parked a vehicle haphazardly and encroaches or nearly encroaches a border of a currently allocated parking space.

Based on a result of processing at blocks 1111-1113, manager system 110 at block 1114 can update an activity record to transition a state of an activity record of a user and send information to a user computer device, e.g. computer device 130A. Manager system 110 at block 1114 can adapt a displayed user interface based on the updated activity record. For example, manager system 110 can send for display on user interface 300 having the area 328 (labeled "YOU HAVE PARKED!") highlighted. Area 328 of user interface 300 can indicate the time left on the reservation and can provide certain options where appropriate. For example, if a user has selected a new parking space other than the spot subject to reservation a user can be presented with button 332 permitting a user to sell back the prior reserved parking space (all of the remaining time not used) not used and/or can be presented with option block 334 allowing a user to sublease the parking space not used. For example, there can be a major entertainment event occurring and parking spaces may be limited. On driving to a parking area, a user may notice that there is a free parking space available, other than the reserved parking space, and then may elect to use the space other than the user's reserved space and sublease the previously reserved space to another user. Accept button 336 permits a user to accept a renegotiated transaction to the extent that it has been renegotiated. Manager system 110 can output a variety of communications based on arrival of a vehicle of a vehicle driver user at a parking space, e.g. communications to update an activity record, to control indicator system 150, to control a user interface 300, to log an entry into a payment processing system 160.

At block 1116, manager system 110 can perform processing based on user selections made by a user at block 1302 as selected using a manually operated user interface. User computer device 130A can send information at block 1303 to manager system 110 for receipt by manager system 110 at block 1115. At block 1116 manager system 110 can perform further processing and receive data including the reservation request data received at block 1115. Manager system 110 can output a variety of communications based on obtaining of user defined selections entered into a manually operated user interface e.g. user interface 300, e.g. communications to update an activity record, to control indicator system 150, to control a user interface 300, to log an entry into a payment processing system 160.

At block 1117, manager system 110 can perform outputting a communication to indicator system 150 for receipt by indicator system 150 at block 1503. The outputting at block 1117 can be based on processing at blocks 1111-1116, and/or other processing blocks and can include e.g. outputting indication to change a color of a border delineating the parking space not occupied by a user's vehicle to indicate the occupied status of the parking space e.g. if the parking space was previously not reserved and is now occupied by the user's vehicle, the indicated color of a border 410 and/or border 411 might be changed from green to blue. If the parking space now occupied by the user's vehicle is the parking space previously reserved by the user the outputting at block 1117 can include a communication to change the color of the parking space occupied from yellow to blue.

Manager system 110 can account for situations where a user uses more than the previously negotiated space to park his or her vehicle e.g. may park haphazardly or based on special requirements of passengers may park a substantial distance from a border delineating a parking space or may be carrying a trailer. In such a situation, manager system 110 can initiate a parking space adjustment process and can automatically renegotiate a current transaction e.g. to increase the price of a parking space. Manager system 110 can record updated price terms in an activity record of a vehicle driver user. Outputting at block 1117 for processing at block 1113 in the case that a user has used more than a previously allocated parking space in parking, can include outputting a communication at block 1117 so that indicator system 150 regenerates borders e.g. borders 410 and/or 411 to indicate a larger parking space for the user having a vehicle now parked. Manager system 110 can output a variety of communications based on manager system 110 parking space adjustment process being performed, e.g. communications to update an activity record (e.g. to record an updated price), to control indicator system 150, to user interface 300, to control a user interface 300, to log an entry into a payment processing system 160.

On return of a user to initiate exiting of a parking space, manager system 110 can automatically detect the user initiating exiting and prior to the user driving off, can send to the user e.g. at computer device 130A, user interface 130 highlighting area 338 of user interface 300. Area 338 can facilitate renegotiated transactions in the event the user is exiting a reserved parking space prior to a scheduled departure time. In some cases, manager system 110 can determine that it is possible for the user to sell back the remaining time on the reservation in which case, the sell back remaining time button 340 can be presented for selection by a user. In some cases, manager system 110 can determine that it is possible for the user to sub-lease remaining time on the reservation in which case the user can be prompted with block 344 accept button 346 permits user to accept and renegotiate a transaction. Manager system 110 can output a variety of communications based on a determination that a vehicle driver user has initiated exiting of a parking space, e.g. communications to update an activity record, to control indicator system 150, to user interface 300, to control a user interface 300, to log an entry into a payment processing system 160.

Referring to buttons 332 and 340 of user interface 300 manager system 110 in some instances can determine that it is appropriate for manager system 110 to buy back remaining time on a parking space reservation e.g. an entirety of remaining time (in which case button 332 can be highlighted) or a portion of an original reserved time period (in which case button 340 can be highlighted). In one embodiment, manager system 110 can determine that it is appropriate for manager system 110 to buy back remaining time of a reservation based on a determined probability that the time can be re-sold. Manager system 110 can determine appropriateness of sell back based on a probability value exceeding a threshold. In one embodiment manager system can determine probability as a function of weighted factors, e.g. using formula of Equation 1 below.

$$P = W1F1 + W2F1 \quad \text{(Equation 1)}$$

Where P is the probability of sell back, F1 is a probability of sellback based on a crowding factor, F2 is a probability of a sellback based on a weather factor, W1 is a weight associated with a the factor F1 and W2 is a weight associated with the factor F2. Embodiments herein recognize that information on crowding can be determined by examining newsfeed data from a newsfeed system such as newsfeed system 171 which newsfeed data can include information such as information on scheduled entertainment event. Embodiments herein recognize that information on weather can be determined by examining weather data from a weather service system such as weather service system 172 which can include information on e.g. predicted storms and temperature. There is set forth herein in one embodiment, manager system 110 determining a probability of selling a parking space, wherein the probability of selling a parking space is determined based on a function of weighted factors including a newsfeed weighted factor and a weather weighted factor, wherein determining the newsfeed weighted factor includes subjecting newsfeed data from a newsfeed system to processing by a Natural Language Processing (NLP) process, and wherein determining the weather weighted factor includes subjecting weather data from a weather service system to processing by an NLP process.

Manager system 110 can present on user interface 300 additional options for user selection. For example on determining that a user's reservation is nearing expiration manager system can conditionally initiate presentment of an option to reserve additional time at the parking space coordinates of the current reservation. The initiation of the option to reserve additional time can be based on variety of factors. For example, manager system 110, can determine whether coordinates of a parking space of the user's reservation have been reserved as part of a second reservation by another user for a succeeding time period succeeding the time period of the user's reservation. On the determination that there is no reservation to another user at the coordinates for the succeeding time period manager system can initiate the communication to present the additional time period option. In another embodiment manager system 110 can determine whether coordinates of a parking space of the user's reservation have been reserved as part of a second reservation for a succeeding time period succeeding the time period of the user's reservation. On the determination that there is a second conflicting reservation to another user at the coordinates for the succeeding time period manager system 110 can initiate the communication to present the additional time period option further conditionally on manager system 110 confirming that not reserved areas of a parking area are sufficient so that manager system 110 can reallocate a parking space location of the second conflicting reservation to a different location having location coordinates not conflicting with the parking space location coordinates of the user's reservation.

Manager system 110 can present on user interface 300 an area allowing a user to provide feedback on a user experience in using a parking area managed by manager system 110. In one example manager system can present a series of questions with data input fields prompting a user to enter survey data in the data input fields. Manager system 110 can provide incentives to enter survey information such as involving preferred parking space allocations.

Figure 6:
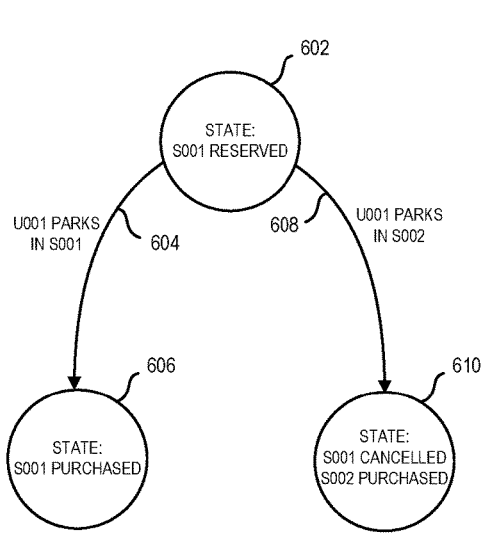
FIG. 6 is a state diagram illustrating state transitions of a vehicle driver user's digital record in one embodiment.
Figure 7:
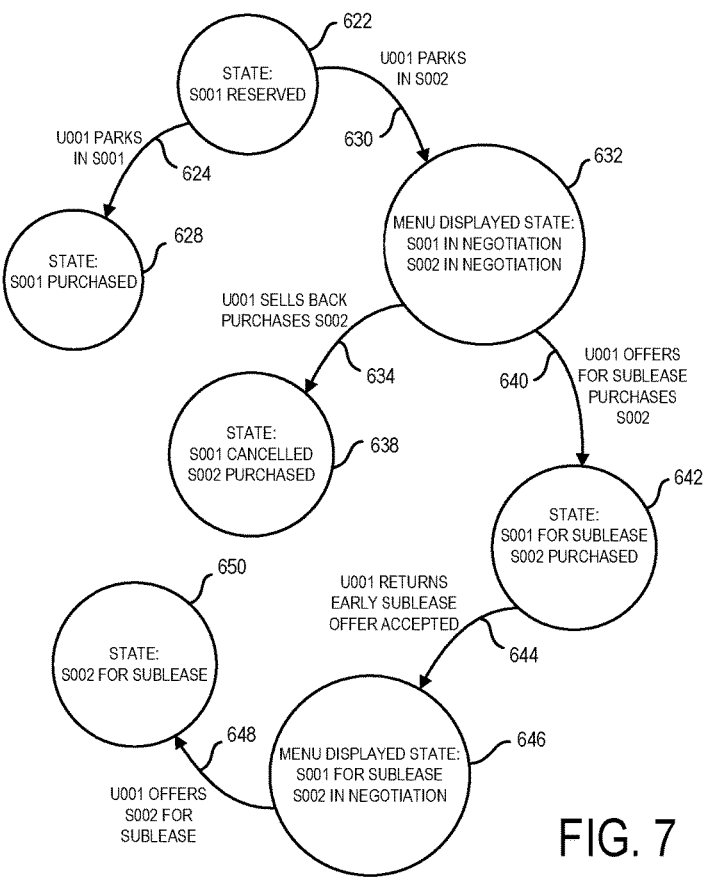
FIG. 7 is a state diagram illustrating state transitions of a vehicle driver user's digital record in one embodiment.

Manager system 110 can run digital records and marketplace process 119 to maintain activity records that specify rights of vehicle driver users of manager system 110 in respect to one or parking space of respective vehicle driver users. FIGS. 6 and 7 illustrate state transitions that can be entered by manager system 110 to an activity record specifying rights of a user in response to obtaining vehicle user driver information provided e.g. by a menu option selection entered into a manually operated user interface and/or a location of a vehicle of a vehicle driver user (e.g. a location indicating arrival at a parking area, parking in a parking space) and/or other activity of a user not involving manually entry of data into a manually operated user interface (e.g. initiating exit from a parking space which can auto-detected e.g. using data of a sensor output of a user computer device or vehicle system. Based on a state of an activity record of a user, manager system 110 can run digital records and marketplace process 119 e.g. to present user interface menu options (sell back, sublease and the like) to a user, and/or to output communications to payment processing system 160 for support of payment processing e.g. via postings to a blockchain ledger and/or via communication with one or more financial institution system. Digital records that record states of a user can be stored in user drivers area 1212 of data repository 112.

FIG. 6 illustrates an embodiment with simplified state control. As indicated by node 602 manager system 110 can specify in an activity record for a user U001 the state "parking space S001 reserved." On the user U001 parking in parking space S001 (edge 604) manager system 110 can update an activity record to transition the state for user U001 to "parking space S001 purchased" (node 606). On user U001 parking in parking space S002 (edge 608) manager system 110 can update an activity record to transition an activity record state for user U001 to "parking space S001 cancelled/space U002 purchased" (node 610).

FIG. 7 illustrates an embodiment that presents various menu options and which can provide additional state control. As indicated by node 622 manager system 110 can specify in an activity record for a user U001 the state "parking space S001 reserved". On the user U001 parking in parking space S001 (edge 624) manager system 110 can update an activity record to transition the state for user U001 to "parking space S001 purchased" (node 628). On user U001 parking in parking space S002 (edge 630) manager system 110 can display a user interface menu and can update an activity record to transition an activity record state for user U001 to "parking space S001 in negotiation/parking space S002 in negotiation." (node 632) On user U001 selecting an option to sell back parking space S001 and selecting an option to purchase parking space S002 (edge 634) manager system 110 can update an activity record to transition a an activity record state for user U001 to "parking space S001 cancelled/parking space S002 purchased." (node 638) On user U001 selecting an option to offer to sublease parking space S001 and selecting an option to purchase parking space S002 (edge 640) manager system 110 can update an activity record to transition a an activity record state for user U001 to "parking space S001 for sublease/parking space S002 purchased." (node 642). On user U001 agreeing to sublease parking space S001 and returning to parking space S002 prior to expiration of a reservation (edge 644) manager system 110 can display a user interface menu and can update an activity record to transition a an activity record state for user U001 to "parking space S001 subleased/parking space S002 in negotiation." (node 646). On user U001 selecting an option to offer parking space S002 for sublease (edge 648) manager system 110 can update an activity record to transition an activity record state for user U001 to "parking space U002 for sublease." (node 650).

In one embodiment manager system 110 can adapt displayed content of a displayed user interface 300 based on an examination of an activity record specifying states examples of which are indicated by the examples of FIGS. 6 and 7.

In one embodiment manager system 110 for performance of outputting a communication to log an entry into payment processing system 160 can log entries to a blockchain ledger network system that maintains a blockchain ledger. Manager system 110 can log entries into a blockchain ledger based on an examination of a user's activity record specifying states such as are indicated in FIGS. 6 and 7, and additional information such as price terms that can be based on various factors including size of parking space that is subject to dynamic adjustment. For example, manager system 110 can log entries to a blockchain ledger based on an examination of a user's activity record indicating that an activity record for a user has been updated, e.g. that a state for a user has transitioned, e.g. to a "reserved" state, a "purchased state" an "in negotiation" state a "for sublease" state a "sublease" state and/or a "cancelled" state. In a blockchain ledger confirmed and validated transaction blocks can be linked and chained from the beginning of the chain to the most current block. A blockchain ledger can act as a single source of transaction information. In one configuration members in a blockchain ledger network can view only those transactions that are relevant to them.

Instead of relying on a third party, such as a financial institution, to mediate transactions, member nodes in a blockchain ledger network use a consensus protocol to agree on ledger content, and cryptographic hashes and digital signatures to ensure the integrity of transactions. Consensus can ensure that the shared ledgers are exact copies, and lowers the risk of fraudulent transactions, because tampering would have to occur across many places at exactly the same time. Cryptographic hashes, such as the SHA256 computational algorithm, ensure that any alteration to transaction input—even the most minuscule change—results in a different hash value being computed, which indicates potentially compromised transaction input. Digital signatures ensure that transactions originated from senders (signed with private keys) and not imposters.

The decentralized peer-to-peer blockchain ledger network prevents any single participant or group of participants from controlling the underlying infrastructure or undermining the entire system. Participants in the network are all equal, adhering to the same protocols. They can be individuals, state actors, organizations, or a combination of all these types of participants. A blockchain ledger can record the chronological order of transactions recorded for payment processing with all nodes agreeing to the validity of transactions using the chosen consensus model. The result is transactions that are irreversible and agreed to by all members in the network.

In legacy business networks, all participants maintain their own ledgers with duplication and discrepancies that result in disputes, increased settlement times, and the need for intermediaries with their associated overhead costs. Using a shared blockchain ledger, where transactions cannot be altered once validated by consensus and written to the ledger, businesses can save time and costs while reducing risks. Blockchain ledgers can provide improved transparency among willing participants, automation, ledger customization, and improved trust in record keeping. In one embodiment manager system 110 for performance of outputting a communication to log an entry into payment processing system 160 can log an entry into a ledger maintained by a financial institution system operated by a financial institution. Send block 1118 by manager system 110, receive block 1601 by payment processing system 160, and return block receive block 1119 (by manager system 110) refer communications between manager system 110 and payment processing system 160 for support of payment processing. Blocks 1101-1119 can be repeatedly performed by manager system 110 on an ongoing open loop basis. In one embodiment manager system 110 can output communications to log an entry into payment processing system numerous times during performance of blocks 1101-1119, each time there is an update of an activity record in one embodiment.

Further aspects of system 100 in one embodiment are described in reference to FIGS. 8-15 illustrating various use cases, wherein FIGS. 8-11 illustrate implementations in a roadside parking area and FIGS. 12-15 illustrate implementations in a parking lot parking area. In the embodiments of FIGS. 8-15 borders delineating parking spaces are described as having specific colors that indicate the current status of the parking space. In FIGS. 8-11, Y=Yellow, B=Blue, G=Green, and R=Red. In the described embodiments, a border indicated with yellow can indicate that the user driving the vehicle has arrived at a location of a parking area, with yellow borders "Y" indicating the reserved parking space of the user. Blue borders "B" can indicate occupied parking spaces that are occupied by users that have reserved the occupied parking spaces. Green borders "G" can indicate parking spaces that are currently not subject to any reservation and are open for parking by any user. Red borders "R" can indicate reserved parking spaces that are currently not occupied by any users. The color indications can be useful in a number of scenarios. For example, on arrival at a parking area a user who has reserved a parking space can benefit from the knowledge of whether a reserved parking space is that user's reserved parking space or the reserved parking space of another user. Accordingly, system 100 e.g. via an output communication from manager system 110 to indicator system 150 can be configured to switch an indicated color of a border from e.g. red to yellow on the condition that a user has arrived at a parking area. If a user arrives at a parking area, who has not reserved any parking space and is seeing if there are any open, not reserved parking spaces the user can benefit from indication indicating whether an open space is a reserved parking space, at which the user is not authorized to park at or an not reserved parking space, which can be indicated in green to indicate that the user is authorized to park in the open space and subsequent to parking, can transact to reserve the now occupied parking space.

Referring to FIG. 8, FIG. 8 illustrates the use case where the user driving the vehicle, arrives at a parking area where the user has reserved a parking space. In the described example of FIG. 8, the parking space indicated by yellow borders "Y" indicates the user's reserved parking space. Manager system 110 can be configured so that via output of a communication to indicator system 150 prior to arrival of the vehicle driver user at a the parking space indicated with yellow borders "Y" is displayed with red borders "R", to indicate to other users that they should not occupy that space, as the space has been previously reserved by another user who has not yet arrived.

Referring to FIG. 9, FIG. 9 illustrates the parking area as shown in FIG. 8 after the user has occupied the user's reserved parking space. It is seen in FIG. 9 that via an output of a communication from manager system 110 to indicator system 150 the border indicated with yellow borders "Y" is changed to new format wherein the borders are indicated in blue color.

Figures 10, 11:
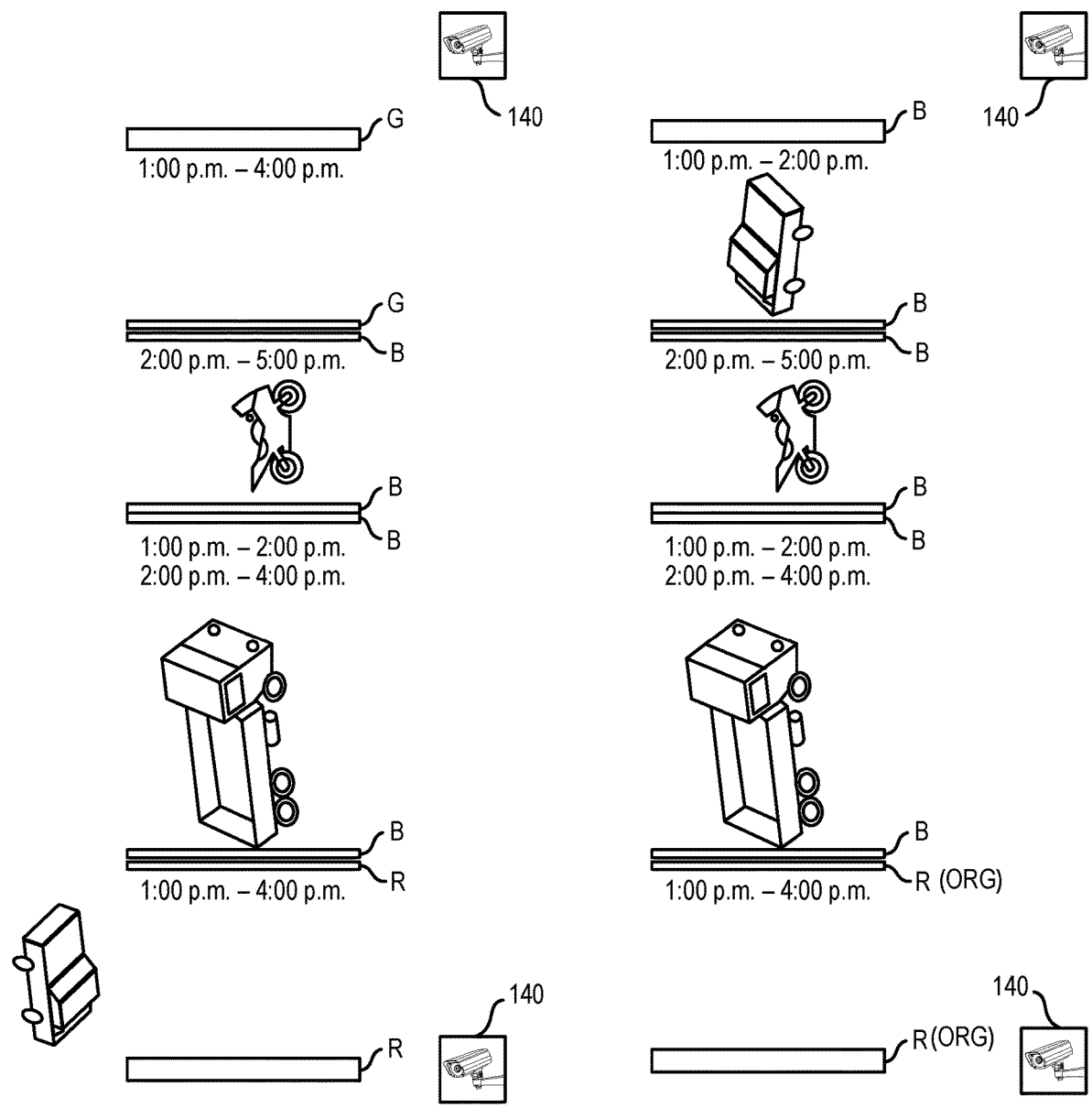
FIG. 10 depicts a parking area in use in one embodiment.
FIG. 11 depicts a parking area in use in one embodiment.

FIGS. 10 and 11 illustrate the use case where a vehicle driver user driving a vehicle arrives at a parking area without any reservation and is scanning the area for open parking spaces. The user approaching the parking area, indicated in FIG. 10, can discern that there are two open parking spaces but that one of the parking spaces has been previously reserved and one of the parking spaces is not reserved, the reserved open parking space can be indicated with a red parking space border and the not reserved open space can be indicated with green parking space border. As shown in FIG. 11, the user based on the indication provided by indicator system 150 can select a parking space previously indicated by green illumination as the parking space to park in and subsequent to parking, can transact to reserve the now occupied parking space.

Figure 12:
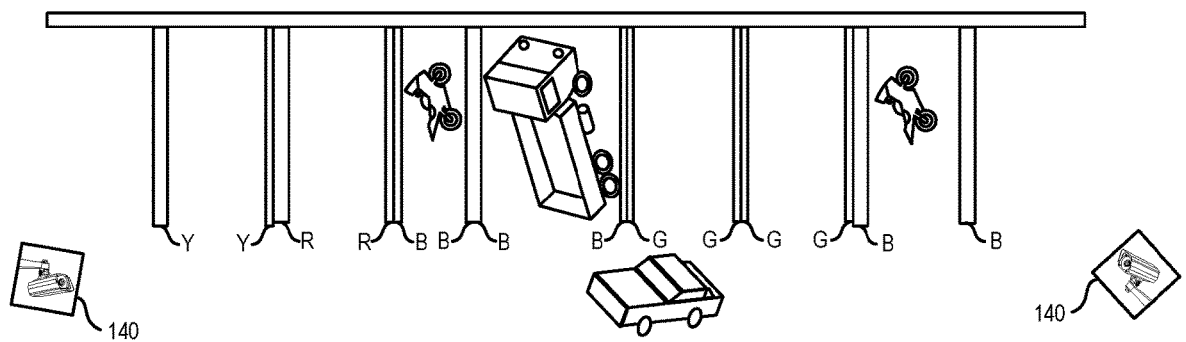
FIG. 12 depicts a parking area use in one embodiment.
Figure 13:
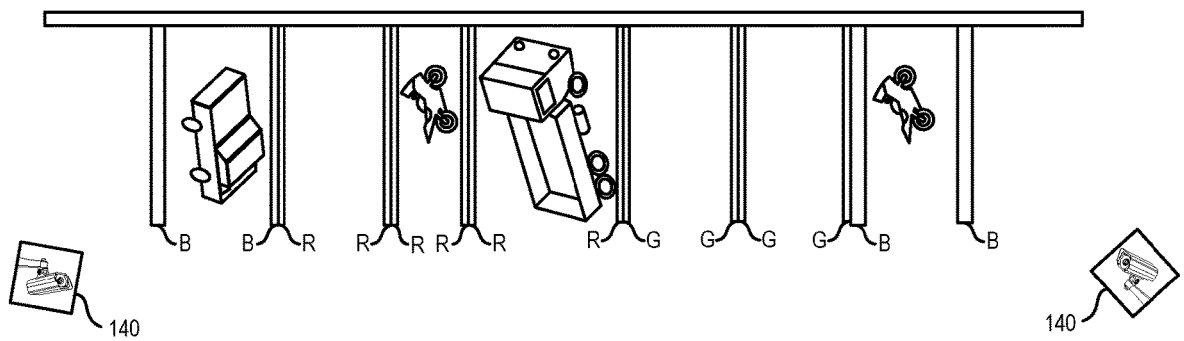
FIG. 13 depicts a parking area in use in one embodiment.

FIGS. 12 and 13, illustrate the use case where a vehicle driver user parks the user's vehicle in a parking space previously reserved by the user. On arrival at a parking area shown in FIG. 12, manager system 110 can output a communication to indicator system 150 to change an indication provided by indicator system 150 so that the parking space reserved by the user can be indicated with yellow borders "Y." As shown in FIG. 13 the user can select the parking space previously indicated with yellow borders "Y" as the parking space to park in. On parking user's vehicle, manager system 110 can output a communication to indicator system 150 so that the borders previously indicated with yellow borders "Y" can be changed so that the parking space is indicated with blue borders "B".

Figure 14:
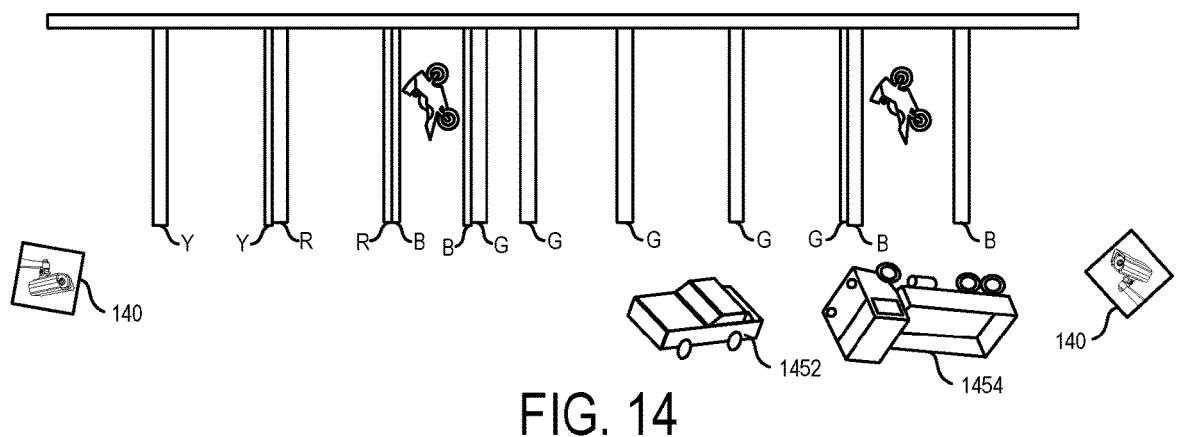
FIG. 14 depicts a parking area in use in one embodiment.
Figure 15:
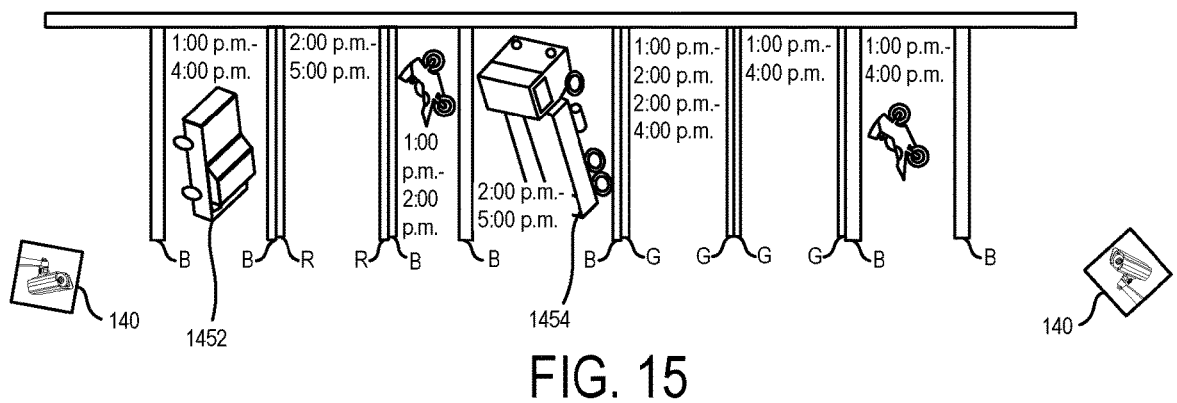
FIG. 15 depicts a parking area in use in one embodiment.

FIGS. 14 and 15 illustrate the use case where first and second vehicle driver users driving first and second vehicles 1452 and 1454 arrive at a parking area. The first vehicle driver user driving the first vehicle 1452 knows that the first vehicle driver user has previously reserved a parking space and can observe the reserved parking space based on the indicated yellow borders "Y". The first vehicle driver user as shown in FIG. 15 can select the parking space indicated by yellow borders "Y" in FIG. 14 as the parking space the park in. On parking by the first vehicle driver manager system 110 can send a communication to indicator system 150 to change an indication so that the parking space now occupied by the first vehicle driver user's vehicle is indicated with blue borders "B." The second vehicle driver user driving the second vehicle 1454 can select the green designated parking space as a parking space to park at. As shown in FIGS. 14 and 15 the second vehicle 1454 can be an unusually large-sized vehicle such as a truck. On the second vehicle driver user selecting a parking space and parking the second user's vehicle 1454 as shown in FIG. 15, manager system 110 can automatically activate parking space management process 117 to expand the dimension information of the parking space and the indicating borders indicating and delimiting the occupied parking space. Manager system 110 can responsively send a communication to indicator system 150 to provide indication indicating the expansion of the borders and also changing the colors of the borders of the parking space now occupied by the second vehicle so that the parking space occupied by the second and larger vehicle is indicated with blue borders "B" to indicate an occupied state.

Referring to FIGS. 8-15, it is seen that manager system 110 can automatically adjust the dimension information of a parking space based on dimension information of a vehicle occupying a parking space e.g. based on user-defined information regarding a vehicle received by manager system 110, based on looked up information regarding dimension information of a vehicle, looked up information indicating a driving ability of a vehicle driver user, looked up information on dimension information of the vehicle and/or or based on processing of image data received from camera system 140. In one embodiment manager system 110 can extract dimension information of a certain vehicle entering a parking rea via image processing to process image data received from camera system 140 representing the certain vehicle. Extracting of dimensional image from image data can include configuring camera system 140 to provide three dimensional (3D) image data and processing the 3D image data. In the examples of FIGS. 8-15 it is seen that manager system 110 can define and allocate relatively larger parking spaces to larger vehicles, such as trucks, and can define smaller parking spaces for smaller vehicles, such as motorcycles. Referring to FIGS. 8-15, indicators indicated by indicator system 150 can include indicators other than parking space borders. For example, as indicated by FIGS. 8-15, indicator system 150 can indicate time periods of parking space reservations e.g. as may be displayed on a vertically oriented electronic display such an electronic display 416 as shown in FIG. 4.

Table B sets forth in pseudocode an exemplary process for use in providing parking area management.

TABLE B

Pseudocode for Parking Area Management

While parking area indicator system is in use do
    Set Unallocated parking spaces = green; Set Reserved parking
spaces = red; Set Properly occupied spaces = blue
    Display additional parking annotations (lock ahead, availability, etc.)
    If new or updated driver reservation for a parking space (based on
profile/preferences) is detected then
        update parking annotation system with reservation information
        ensure appropriate size of parking space reserved (based on user
preference and reservation time) is reflected in the parking area
indicator system
        If real-time updates regarding weather, traffic, safety, etc. for
        this reservation exist then TABLE B-continued Pseudocode for Parking Area Management

```
            share real-time updates with driver
        end
    end
    If driver with reservation for a parking space (based on
profile/preferences) is detected near reserved parking space then
        transition parking space border indication from red to yellow
        if parking intake complete then
            transition parking space border indication from yellow
            to blue
            ensure vehicle is parked within parking size limit and
recalculate allocated parking space and parking space border indications
as necessary
log financial transaction appropriately
        else parking intake did not complete, so leave lighting
        indicators yellow
        end
    Else driver without reservation for a parking space is detected
        If parking intake complete then
            if parking is valid then
                transition parking space border indication from green
to blue for appropriate size based on vehicle parked
log financial transaction appropriately
            else (parking is invalid)
                transition parking space border indication from green
                to red
            end
        end
    end
enddo
```

Note:
Insurance updates, application updates also occur as appropriate within the algorithm.

Embodiments herein can provide "smart" support systems coupled with advanced sensing, video and can address shortcomings of current systems. Embodiments herein can provide cognitive systems to recognize, integrate, direct and manage eligible arrivals into a space allocation schemes based on no "lines" or singular static sizing of parking spaces. Use of dynamic vehicle placement and grouping optimization can lead to maximal occupants in minimal space, regular and proper in/out pathway management, responsive and even proactive compliance enforcement, and enhanced safety and convenience for all participants. Coupled with vacancy "look-ahead", situational re-routing and reservation functionality, components can combine to satisfy customers' expectations for successful trip planning that includes ingress, access and egress to/from appropriate vehicle parking.

Embodiment herein recognize that current parking area systems do not provide marketplace option to trade and sublease of allocated parking space between drivers and/or owners, do not provide automatic payment schemes target a user's car type and characteristics such as size, economy or environment footprint (electric versus fossil fuel, etc.) for differential treatments. Embodiments herein recognize that current parking area systems do not provide for driver to receive benefits based on consistent usage of a parking space(s) in collaboration with others. Embodiments herein recognize that current parking area systems do not provide automated parking space trades or upgrades based on driver feedback or usage. Embodiment herein recognize that current parking area systems do not correlate dynamics of cars being driven, persons driving, parking slots reserved, events on a particular day, recent situations (traffic levels, population in a given area, etc.), predicted weather, proximity of others or availability of police or security.

Embodiments herein can cognitively provide dynamic information, recognize demands, and manage space allocations for real estate formerly mapped and delineated in a static manner. Artificial intelligence platforms as set forth herein can yield predictable and satisfying access for parking consumers, along with more optimal usages and revenues for property owners and operators. Embodiment herein can provide coherent, situation-aware systems utilizing advanced video analytics and correlation along with a wide array of sensing capabilities in order to determine whom is approaching, whom is on premise and whom is exiting a parking area. Embodiments herein can provide recommendations based on analysis of external factors such as weather, crowding, traffic, or even assessed safety threats. Embodiments herein can provide a "connected" vehicle that participates in a request-response-receive-guidance sequence based on a vehicle driver user's destination intentions.

Embodiments herein can provide cognitive facility systems coupled with advanced and reactive sensing and analytics and can provide connected vehicle participation for predictable, safe and optimal parking. Embodiments herein can provide advantages for drivers, parking area provider entities (private or public), cities and other locales, risk (insurance) managers and servicers (towing companies, etc.). Embodiments herein can provide automatic adjustments to parking space (private or public) location and or dimension based on preferences, vehicle sizes, driver abilities and other factors. Embodiment herein can provide a parking area marketplaces for reservations, subleasing or trading and can include automated usage billing. Embodiment herein can provide real time views of parking situations, including views specifying current events, crowding, weather, traffic, security and assessed safety threats. Feedback and even ratings for parking spaces, potentially involving even social media and leading to recommendations and guidance can be provided vehicle driver users. Embodiment herein can provide automated compliance enforcement (towing, etc.) and processing/revenue for property owners.

Embodiments herein can provide a vehicle driver user to provide on the spot or later feedback regarding the parking experience and environment, whether by voice recording or other (electronic) means. In one embodiment system 100 can be configured so that if a parking space is lit Red, indicating that someone has a reservation for it, improper consumption by someone else can result in the lighting returning to Red, which after a time could drive notifications to both parking enforcement and the (reservation's) owning vehicle driver user. If resolution of the situation is not to be immediate (likely due to the offending driver not being there), the reservation holder could be offered parking alternatives and/or other compensations such as rate discounts. On the enforcement end, actions against a reservation violator could be initiated using vehicle license plate e.g. which manager system 110 can automatically read using data received from camera system 140 and/or other registration (i.e., VIN) information, with action e.g. citations, "booting", towing and/or impounding being automatically initiated.

Certain embodiments herein may offer various technical computing advantages, involving computing advantages to address problems arising in the realm of computer networks such as improved data input and output processes in a computer network implemented to service vehicle user drivers. Embodiments herein can feature use of data from particular arrangements of sensors, such as for sensing location or spatial image features as well as control of particular indicators, such as control of an indicator system indicting features of certain physical structures. Embodiments herein can feature for example data input functionality to automatically update an activity record to transition state of an activity record based e.g. on detected physical location of vehicle driver user vehicle or another detected activity. Embodiments herein can feature for example data input and output functionality to automatically change an indicator of an indicator system viewable by persons at a parking area based on detected physical location of vehicle driver user vehicle. Various artificial intelligence platforms can be utilized such as platforms to automatically determine allocation of location and dimensions of a parking space based on data from one or a plurality of data sources. Embodiments herein can include artificial intelligence processing platforms featuring improved processes to transform unstructured data into structured form permitting computer based analytics and predictive decision making. Embodiments herein can include artificial intelligence processing platforms featuring predictive decision making based on functions involving a plurality of weighted factors.

Figure 16:
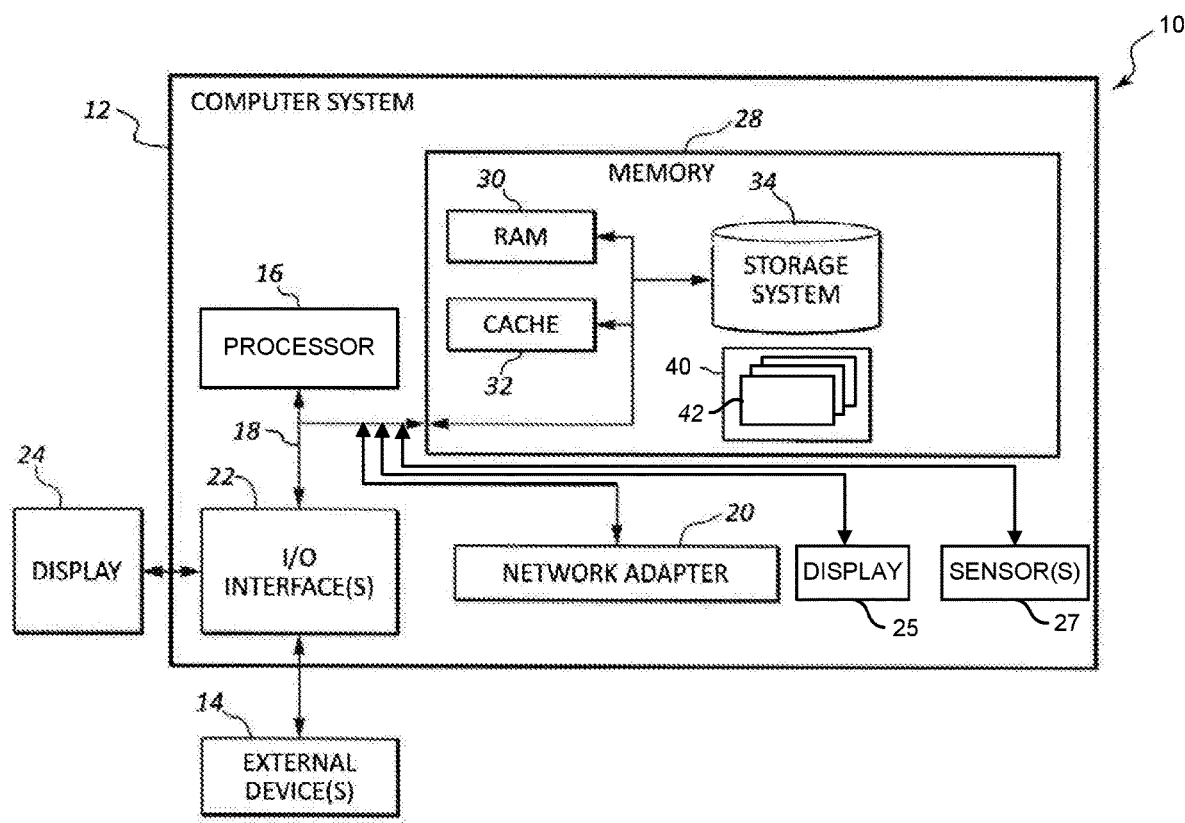
FIG. 16 depicts a computing node according to one embodiment.
Figure 17:
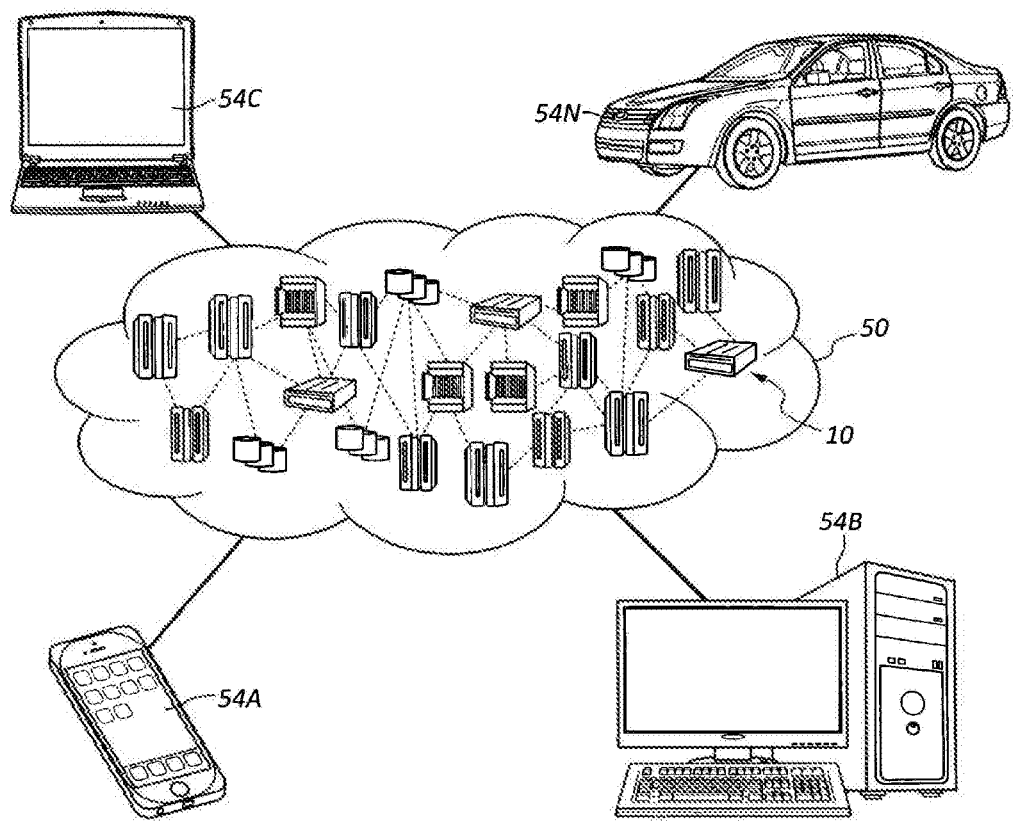
FIG. 17 depicts a cloud computing environment according to one embodiment.
Figure 18:
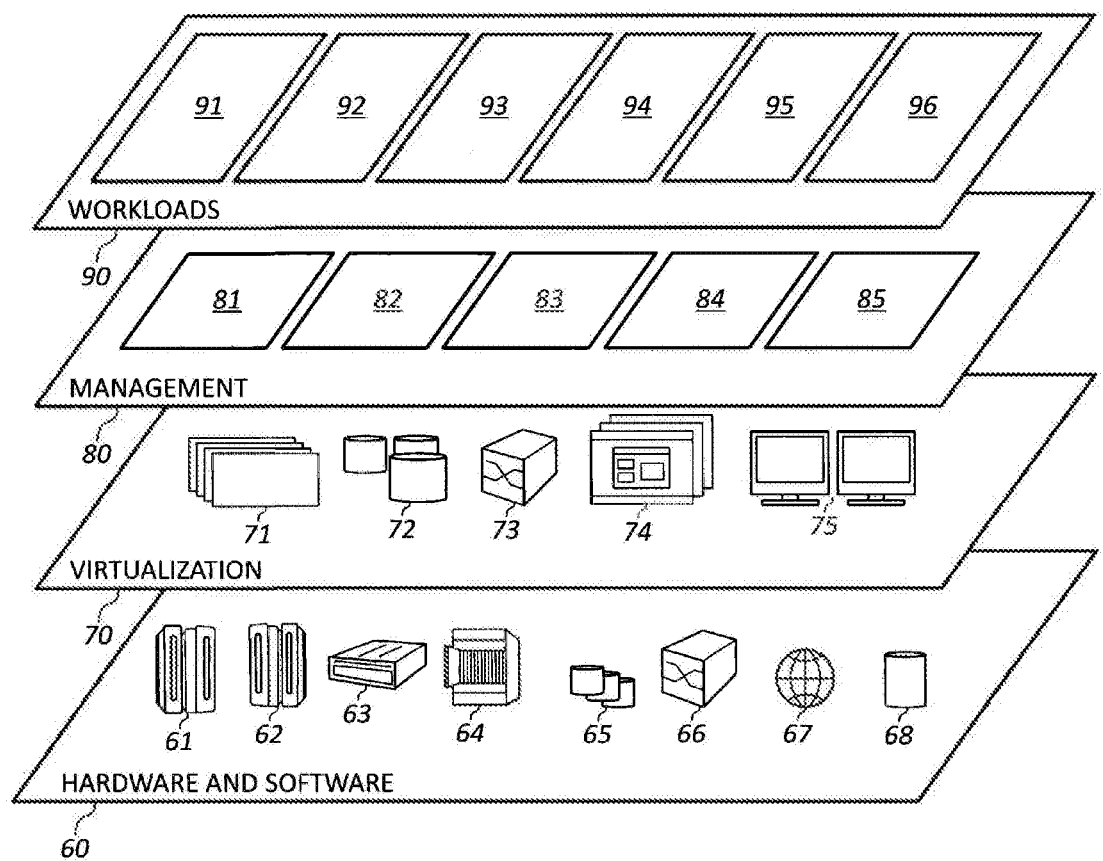
FIG. 18 depicts abstraction model layers according to one embodiment.

FIGS. 16-18 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 16, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 16, computer system 12 in computing node 10 is shown in the form of a general-purpose computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 17-18.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 2, and the functions described with reference to manager system 110 as set forth in the flowchart of FIG. 5. In one embodiment, one or more vehicle system 120A-120Z can include one or more computing node 10 and can include one or more program 40 for performing functions described with reference to vehicle system 120A as set forth in the flowchart of FIG. 5. In one embodiment, each of systems 170-173 can include one or more computing node 10 and can include one or more program 40 for performing functions described with reference to systems 170-173 as set forth in the flowchart of FIG. 5. In one embodiment, camera system 140 can include one or more computing node 10 and can include one or more program 40 for performing functions described with reference to camera system 140 as set forth in the flowchart of FIG. 5. In one embodiment, indicator system 150 can include one or more computing node 10 and can include one or more program 40 for performing functions described with reference to indicator system 150 as set forth in the flowchart of FIG. 5. In one embodiment, payment processing system 160 can include one or more computing node 10 and can include one or more program 40 for performing functions described with reference to payment processing system 160 as set forth in the flowchart of FIG. 5. In one embodiment, one or more user computer device 130A-130Z can include one or more computing node 10 and can include one or more program 40 for performing functions described with reference to computer device 130A as set forth in the flowchart of FIG. 5.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 16 computing node 10 is described as being implemented in a cloud computing environment and accordingly is referred to as a cloud computing node in the context of FIG. 16.

Referring now to FIG. 17, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for parking area and parking space management as set forth herein. The processing components 96 can be implemented with use of one or more program 40 described in FIG. 16.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining user information of a vehicle driver user, the vehicle driver user being a user of a computer based system for managing a parking area;
processing information of the user information; and
outputting a communication to control an indicator system based on the processing, wherein the indicator system is provided as a fixture of the parking area and wherein the indicator system is configured to provide indications viewable by vehicle drivers driving within the parking area, wherein the method includes determining a probability of selling a parking space and based on a determining that the probability exceeds a threshold offering the vehicle driver user to buy back reserved time for the parking space, wherein the probability of selling a parking space is determined based on a function of weighted factors including a newsfeed weighted factor and a weather weighted factor, wherein determining the newsfeed weighted factor includes subjecting newsfeed data from a newsfeed system to processing by a Natural Language Processing (NLP) process, and wherein determining the weather weighted factor includes subjecting weather data from a weather service system to processing by an NLP process.

2. The method of claim 1, wherein the communication to control an indicator system is a control to adjust a position of one or more border delimiting one or more parking space of the parking area.

3. The method of claim 1, wherein the information of the user information includes one or more of the following selected from the group consisting of: (a) vehicle dimension information of a vehicle of the vehicle driver user, (b) a location of vehicle of the vehicle driver user, (c) a reservation selection by the vehicle driver user, and (d) driving ability of the vehicle driver user.

4. The method of claim 1, wherein processing information of the user information includes performing processing to determine that a criteria is satisfied, wherein the criteria is selected from the group consisting of: (a) that a vehicle driver user has arrived at location of a parking area, (b) that a vehicle driver user has parked at a location of a parking space, (c) that a vehicle driver user has initiated exiting of a parking space, (d) that a vehicle driver user has exited a parking space, (d) that a certain user interface selection has been made, and (e) that that parking space adjustment process has been performed to adjust a parking space for the vehicle driver user, and wherein the outputting further includes outputting a communication to update an activity record, outputting a communication to control a user interface, and outputting a communication to log an entry into a payment processing system.

5. The method of claim 1, wherein processing information of the user information includes performing processing to determine that a criteria is satisfied, wherein the criteria is that a parking space adjustment process is performed to adjust a parking space allocation of the vehicle driver user, wherein initiation of the parking space adjustment process is based on one or more of the following selected from the group consisting of: (a) user defined selection information entered into manually operated user interface (b) dimensional information of a vehicle of a vehicle driver user (c) driving ability information of a vehicle driver user, (d) a parking accuracy determination and (e) weather information.

6. The method of claim 1, wherein processing information of the user information includes performing processing to determine that a criteria is satisfied, wherein the criteria is that a parking space adjustment process is performed to adjust a parking space allocated to the vehicle driver user based on a parking space adjustment condition being satisfied, and wherein the parking space adjustment process is a parking space enlargement process that is performed so that an enlarged parking space allocated to the vehicle driver user by the parking space enlargement process includes coordinate locations of the parking space allocated to the vehicle driver user prior to initiation of the parking space adjustment process.

7. The method of claim 1, wherein the method includes performing a parking space adjustment process so that an adjusted parking space allocated to the vehicle driver user by the parking space adjustment process includes coordinate locations of a parking space allocated to the vehicle driver user prior to initiation of the parking space adjustment process, and defining a larger area than an area defined by coordinate locations of the parking space allocated to the vehicle driver user prior to initiation of the parking space adjustment process, and wherein the method includes increasing a parking space price for the vehicle driver user based on the performing a parking space adjustment process.

8. The method of claim 1, wherein the method includes maintaining an activity record specifying rights of the vehicle driver user for one or more parking space of the parking area, and wherein the method includes automatically transitioning a state of the activity record in response to the vehicle driver user parking a vehicle of the vehicle driver user in the parking area.

9. The method of claim 1, wherein the method includes maintaining an activity record specifying rights of the vehicle driver user for one or more parking space of the parking area, and wherein the method includes automatically transitioning a state of the activity record in response to the vehicle driver user initiating exiting of a parking space prior to expiration of a reservation time period.

10. The method of claim 1, wherein the method includes one or more of the following selected from the group consisting of: (a) processing a data of a vehicle of the vehicle driver user for determining that the vehicle has entered a parking area and wherein the outputting includes responsively to the determining outputting a communication so that the indicator system indicates that the vehicle has entered the parking area; (b) processing of data of a vehicle of the vehicle driver user for determining that the vehicle is parked in a parking space and wherein the outputting includes responsively to the determining outputting a communication so that the indicator system indicates that the parking space is occupied, and (c) processing of data of a vehicle of the vehicle driver user for determining that the vehicle has exited a parking space and wherein the outputting includes responsively to the determining outputting a communication so that the indicator system indicates that the parking space is unoccupied.

11. The method of claim 1, wherein the processing information of the user information includes processing for determining that the vehicle has initiating exiting a parking space and wherein the processing for determining is performed with the vehicle remaining parked in the parking space.

12. The method of claim 1, wherein the method includes performing the determining a probability of selling the parking space based on an exiting of a vehicle of the vehicle driver user from the parking space.

13. The method of claim 1, wherein the method includes presenting of a user interface entered option to the vehicle driver user to select additional time for a current reservation of an occupied parking space having first location coordinates based on a determining that a parking space of a second reservation specifying location coordinates conflicting with the first location coordinates is subject to relocation.

14. The method of claim 1, wherein the outputting is performed so that the indicator system provides a first indication for indicating a parking space that is open and reserved and a second indication differentiated from the first indication for indicating a parking space that is open and not reserved.

15. The method of claim 1, wherein the information of the user information is information that is entered into a manually operated user interface by the vehicle driver user while the vehicle driver user is remote from the parking area.

16. The method of claim 1, wherein the method includes one or more of the following selected from the group consisting of: (a) determining a driving ability of the vehicle driver user and dynamically adjusting a dimension of a parking space allocated to the vehicle driver user based on the driving ability, (b) determining that a vehicle driver user has participated in a customer loyalty program and dynamically adjusting a dimension of a parking space allocated to the vehicle driver user based on the determining, (c) determining that a vehicle of the vehicle driver user has satisfied requirements of an environmental conservation program and dynamically adjusting a dimension of a parking space allocated to the vehicle driver user based on the determining, and (d) examining data of a weather service system and dynamically adjusting based on the examining one or more of the following selected from the group consisting of: a dimension of a parking space allocated to the vehicle driver user and a location of a parking space allocated to the vehicle driver user.

17. A computer program product comprising:
a computer readable storage medium readable by one or more processing unit circuit and storing instructions for execution by one or more processor for performing a method comprising:
obtaining user information of a vehicle driver user, the vehicle driver user being a user of a computer based system for managing a parking area;
processing information of the user information; and
outputting a communication to control an indicator system based on the processing, wherein the indicator system is configured to provide indications viewable by persons at the parking area, wherein the method includes determining a probability of selling a parking space and based on a determining that the probability exceeds a threshold offering the vehicle driver user to buy back reserved time for the parking space, wherein the probability of selling a parking space is determined based on a function of weighted factors including a newsfeed weighted factor and a weather weighted factor, wherein determining the newsfeed weighted factor includes subjecting newsfeed data from a newsfeed system to processing by a Natural Language Processing (NLP) process, and wherein determining the weather weighted factor includes subjecting weather data from a weather service system to processing by an NLP process.

18. The computer program product of claim 17, wherein the communication to control an indicator system is a control to adjust a position of one or more border delimiting one or more parking space of the parking area.

19. A system comprising:
a memory;
at least one processor in communication with the memory; and
program instructions executable by one or more processor via the memory to perform a method comprising:
obtaining user information of a vehicle driver user, the vehicle driver user being a user of a computer based system for managing a parking area;
processing information of the user information; and
outputting a communication to control an indicator system based on the processing, wherein the indicator system is configured to provide indications viewable by persons at the parking area, wherein the method includes determining a probability of selling a parking space and based on a determining that the probability exceeds a threshold offering the vehicle driver user to buy back reserved time for the parking space, wherein the probability of selling a parking space is determined based on a function of weighted factors including a newsfeed weighted factor and a weather weighted factor, wherein determining the newsfeed weighted factor includes subjecting newsfeed data from a newsfeed system to processing by a Natural Language Processing (NLP) process, and wherein determining the weather weighted factor includes subjecting weather data from a weather service system to processing by an NLP process.

* * * * *